(12) United States Patent
Akpinar et al.

(10) Patent No.: US 10,511,971 B1
(45) Date of Patent: Dec. 17, 2019

(54) SYSTEMS AND METHODS FOR LOCATION ENABLED SEARCH AND SECURE AUTHENTICATION

(71) Applicant: Pointr Limited, London (GB)

(72) Inventors: Ismail Ege Akpinar, London (GB); Mehmet Bilgay Akhan, Hampshire (GB)

(73) Assignee: Pointr Limited, London (GB)

( * ) Notice: Subject to any disclaimer, the term of this patent is extended or adjusted under 35 U.S.C. 154(b) by 0 days.

(21) Appl. No.: 16/451,266

(22) Filed: Jun. 25, 2019

Related U.S. Application Data

(60) Provisional application No. 62/843,662, filed on May 6, 2019.

(51) Int. Cl.
| | |
|---|---|
| *H04W 12/06* | (2009.01) |
| *H04L 29/06* | (2006.01) |
| *H04W 4/029* | (2018.01) |
| *H04W 4/90* | (2018.01) |
| *H04L 9/06* | (2006.01) |
| *G01C 21/36* | (2006.01) |
| *G06Q 50/30* | (2012.01) |
| *H04W 4/024* | (2018.01) |

(52) U.S. Cl.
CPC ........ *H04W 12/06* (2013.01); *G01C 21/3614* (2013.01); *G06Q 50/30* (2013.01); *H04L 9/0643* (2013.01); *H04L 63/0807* (2013.01); *H04W 4/024* (2018.02); *H04W 4/029* (2018.02); *H04W 4/90* (2018.02)

(58) Field of Classification Search
CPC ....... H04W 12/06; H04W 4/029; H04W 4/90; H04W 4/024; G01C 21/3614; H04L 63/0807; H04L 9/0643; G06Q 50/30
See application file for complete search history.

(56) References Cited

U.S. PATENT DOCUMENTS

| | | | |
|---|---|---|---|
| 9,760,702 B1* | 9/2017 | Kursun | G06F 21/32 |
| 9,904,375 B1* | 2/2018 | Donnelly | G01S 7/51 |
| 9,965,960 B1* | 5/2018 | McDavitt-Van Fleet | G06Q 10/00 |
| 10,192,387 B2* | 1/2019 | Brinig | G05D 1/0088 |
| 10,204,528 B2* | 2/2019 | Truong | G09B 19/167 |

(Continued)

FOREIGN PATENT DOCUMENTS

CN 201110336359 * 6/2012 ............ G08G 1/00

*Primary Examiner* — James R Turchen
(74) *Attorney, Agent, or Firm* — Dickinson Wright PLLC; Mark E. Scott; Jonathan H. Harder

(57) ABSTRACT

A method of authentication in ride hailing situations may include transmitting, to a server by a first device of a passenger, a request for a ride to a destination, receiving an indication that a second device of a driver accepted the ride, and communicating first location data of each respective device to the other respective device. The method may also include determining a first distance between the first and second device based on the first location data of the first and second device. Responsive to determining that the first distance satisfies a threshold condition, the method may also include communicating, via a first point-to-point communication between the first and second device, second location data of each respective device to the other respective device. Further, the method may include presenting, based on the second location data, directions for the first and second device to reach each other.

20 Claims, 12 Drawing Sheets

(56) References Cited

U.S. PATENT DOCUMENTS

| | | | |
|---|---|---|---|
| 10,255,739 B1* | 4/2019 | Suleiman | G07C 9/00309 |
| 2006/0155460 A1* | 7/2006 | Raney | G01C 21/20 |
| | | | 701/468 |
| 2008/0277183 A1* | 11/2008 | Huang | B60R 25/00 |
| | | | 180/271 |
| 2009/0172009 A1* | 7/2009 | Schmith | G06Q 30/02 |
| 2013/0256396 A1* | 10/2013 | Rogers | G06Q 10/06 |
| | | | 235/375 |
| 2015/0254581 A1* | 9/2015 | Brahme | G06Q 10/02 |
| | | | 705/5 |
| 2016/0027079 A1* | 1/2016 | Schoeffler | H04N 5/23293 |
| | | | 705/325 |
| 2016/0321771 A1* | 11/2016 | Liu | G06Q 50/30 |
| 2017/0115125 A1* | 4/2017 | Outwater | H04W 4/40 |
| 2017/0310679 A1* | 10/2017 | Childress | H04L 63/107 |
| 2018/0196416 A1* | 7/2018 | Iagnemma | G06Q 50/30 |
| 2019/0017839 A1* | 1/2019 | Eyler | G01C 21/3638 |
| 2019/0073676 A1* | 3/2019 | Wang | G06Q 20/405 |
| 2019/0096021 A1* | 3/2019 | Jarvis | G06Q 20/3223 |
| 2019/0114638 A1* | 4/2019 | Flores | G06Q 20/4014 |
| 2019/0228643 A1* | 7/2019 | Demisse | G08G 1/017 |
| 2019/0259182 A1* | 8/2019 | Sarukkai | G06T 7/97 |
| 2019/0286928 A1* | 9/2019 | Hubschman | G06Q 10/06 |
| 2019/0297450 A1* | 9/2019 | Hwang | H04W 4/02 |

* cited by examiner

Token-P

| Passenger ID 202 | Location 204 | Destination 206 | Timestamp 208 |
|---|---|---|---|

*FIG. 2*

Token-D

| Driver ID 302 | Location 304 | License Plate 306 | Timestamp 308 |
|---|---|---|---|

*FIG. 3*

SYSTEMS AND METHODS FOR LOCATION ENABLED SEARCH AND SECURE AUTHENTICATION

CROSS-REFERENCE TO RELATED APPLICATIONS

The present application claims the benefit of U.S. Provisional Application No. 62/843,662, titled 'SYSTEMS AND METHODS FOR LOCATION ENABLED SEARCH AND SECURE AUTHENTICATION" filed May 6, 2019, the content of which is incorporated herein by reference in its entirety for all purposes.

BACKGROUND

Various ride sharing and ride hailing platforms have mobile applications whereby a server sends the make, model, license plate number, name of the driver, and/or photograph of driver to the proposed passenger. Then, the proposed passenger is primarily charged with correctly identifying the automobile before entering the vehicle. In most cases, the driver is also encouraged to ask for passenger's name before starting the journey as a secondary verification.

Many riders cannot distinguish cars on sight by information such as make and model, and thus some ride sharing and ride hailing services have also implemented adjustable colored signage within the vehicle. The passenger is informed of the color of light to expect as an additional distinguishing and verification feature, or alternatively the passenger can specify the color of the light to be displayed.

SUMMARY

Various example embodiments are directed to electronically identifying the vehicle in ride sharing and ride hailing platforms. More specifically, various example embodiments are directed to a smart electronic method of searching for your intended driver and vehicle, and the example embodiments enable secure authentication of the driver and/or vehicle. Further, the disclosed embodiments may enable more accurate directions toward each other for both the driver and the passenger.

In related embodiments, ride sharing passengers could find each other and be authenticated using the example methods, and walk toward the ride share vehicle in a group fashion.

In one embodiment, a method of authentication in ride hailing situations may include transmitting, to a server, a request for a ride to a destination, the transmitting by a first computing device of a passenger. The method may also include receiving an indication that a second computing device of a driver accepted the ride to the destination, and communicating, via the server, first location data of the first computing device to the second computing device and first location data of the second computing device to the first computing device. The method may also include determining a first distance between the first and second computing device based on the first location data of the first and second computing device. Responsive to determining that the first distance between the first and second computing device satisfies a first threshold distance condition, the method may also include communicating, via a first point-to-point communication between the first computing device and the second computing device, second location data of the first computing device to the second computing device and second location data of the second computing device to the first computing device. Further, the method may include presenting, based on the second location data of the first and second computing device, directions for the first computing device to reach the second computing device and directions for the second computing device to reach the first computing device.

In one embodiment, a system for authentication in ride hailing situations may include a memory storing instructions, a cellular network interface, a first point-to-point communication interface for medium range communication, a display screen, and a processor communicatively coupled to the memory, the cellular network interface, the first point-to-point communication interface, and the display screen, where, when the instructions are executed by the processor, the instructions cause the processor to transmit a request by a passenger for a ride to a destination, the transmitting by the cellular network interface. The instructions, when executed, may also cause the processor to receive an indication that a computing device of a driver accepted the ride to the destination, where the indication comprises a first unique information of the driver and a first token of the driver. The instructions, when executed, may also cause the processor to receive, by way of the cellular network interface, first location data of the computing device from the server, present, on the display screen, directions for the system to reach the computing device based on a first location data of the system and the first location data of the computing device. The instructions, when executed, may also cause the processor to determine, based on the first location data of the system and the computing device, that a first distance between the system and the computing device satisfies a first threshold distance condition, and responsive to the determination, establish a first point-to-point communication session with the computing device of the driver, the establishing by way of the first point-to-point communication interface. The instructions, when executed, may also cause the processor to receive, at the first point-to-point communication interface, second location data of the computing device from the computing device, and present, on the display screen, directions for the system to reach the computing device based on a second location data of the system and the second location data of the computing device.

BRIEF DESCRIPTION OF THE DRAWINGS

For a detailed description of example embodiments, reference will now be made to the accompanying drawings in which:

FIG. 2 shows, in block diagram form, Token-P in accordance with at least some embodiments;

FIG. 3 shows, in block diagram form, Token-D in accordance with at least some embodiments;

DEFINITIONS

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Passenger" of a ride hailing service refers to person who is, or who will be, a passenger of a ride hailing service. For purposes of this disclosure passenger is thus not limited only to persons within the vehicle of a ride hailing service.

"Point-to-point communication" shall mean a wireless communication channel between a first and a second computing device without an intervening device.

DETAILED DESCRIPTION

The following discussion is directed to various embodiments of the present disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In the related art, no safe and secure method exists for identifying your vehicle in ride sharing and ride hailing (collectively hereafter just "ride hailing") service if the ride is called using an application. All applications in the ride hailing industry, including applications used by Uber™ Lyft™, Grab™, GoJek™, and Didi™ guide the passenger towards their assigned vehicle, but dramatically fail in the last 100 meters. As in the case of airports, shopping malls, exhibition halls, to name a few, if 20 ride hailing vehicles are waiting in the same location for passengers, there is no way of guiding the rider in the last 50-20 meters, and all currently existing applications fail in authenticating the driver positively and securely.

Various embodiments, discussed more below, address (at least in part) the shortcomings of the related-art ride hailing platforms as it relates to identifying and authenticating the assigned driver and vehicle.

Figure 1:
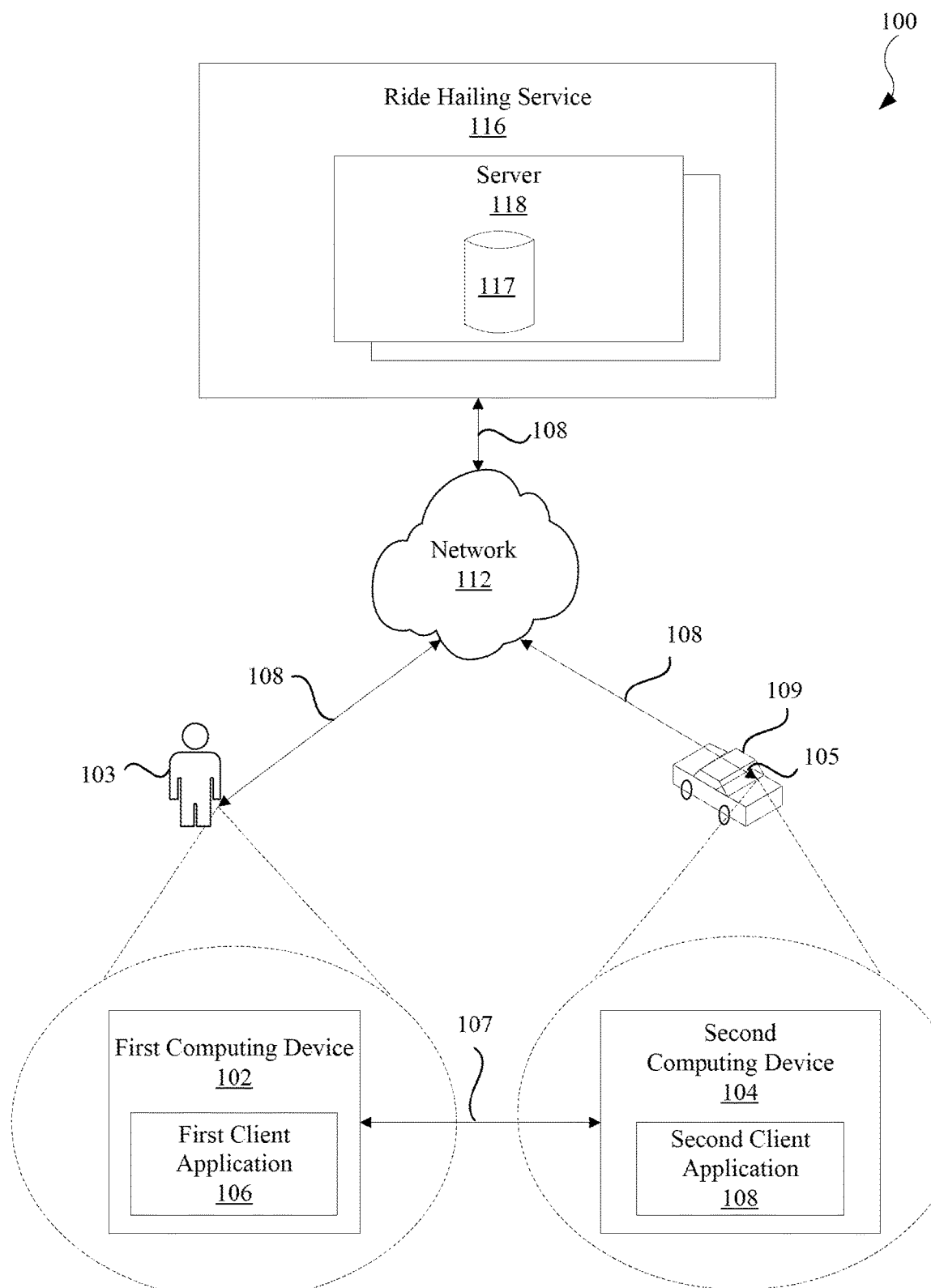
FIG. 1 shows a block diagram of a system in accordance with at least some embodiments.

FIG. 1 shows a block diagram of a system 100 in accordance with at least some embodiments. In some embodiments, the system 100 may include a first computing device 102 of a passenger 103, a second computing device 104 of a driver 105, and a ride hailing service 116 that are communicatively coupled via a network 112. The ride hailing service 116 may include one or more servers 118 that form a cloud-based computing system. The cloud-based computing system may refer to one or more servers 118 implementing a distributed architecture and being accessed over a network link. Each of the first computing device 102, the second computing device 104, and the servers 118 may include one or more processing devices, memory devices, and network interface devices.

The network interface devices may enable communication via a wireless protocol for transmitting data over short distances using low power, such as Bluetooth Low Energy (BLE), ultra wideband (UWB), etc. As such, the first computing device 102 and the second computing device 104 may directly communicate with each other using a point-to-point communication channel (represented by line 107) without an intervening device (e.g., server 118 of the ride hailing service 116). Additionally, the network interface devices may enable communicating data over long distances, and in one example, the computing device 102 and the computing device 104 may communicate with the network 112. Network 112 may be a public network (e.g., connected to the Internet via wireless (e.g., cellular, WiFi)), a private network (e.g., a local area network (LAN) or wide area network (WAN)), or a combination thereof. In some embodiments, the first computing device 102 and the second computing device 104 may communicate data with each other (represented by lines 108) using the servers 118 of the ride hailing service 116 via the network 112.

The ride hailing service 116 may include the one or more servers 118 that form a distributed computing architecture. Each of the servers 118 may be any suitable computing system and may include one or more processing devices, memory devices, data storage, and/or network interface devices. The servers 118 may be in communication with one another via any suitable communication protocol. The servers 118 may use one or more memory devices to store computer instructions and use one or more processing devices to execute the computer instructions to perform one or more operations described herein. The servers 118 may each include at least one database 117 in which the executed computer instructions may store data.

In some embodiments, the server 118 may match passengers requesting rides with drivers in a particular vicinity of the passengers to each other. The server 118 may cause the presentation, on the first computing device 102, of an option for the passenger 103 to request a ride to a destination, among other things. Further, the server 118 may cause the presentation, on the second computing device 104, of an option for the driver 105 to view available ride requests and accept ride requests, among other things. The server 118 may initially communicate data between the first computing device 102 and the second computing device 104 via the network 112. The server 118 may generate the data and/or store the data that is received/generated in the database 117. The data may include unique information for the respective passenger 103 and the respective driver 105, a token for the respective passenger 103 and the respective driver 105, and a device type for the respective first computing device 102 and respective second computing device 104, among other things, as described in further detail below.

The first computing device 102 may be any suitable computing device, such as a smart phone, laptop, or tablet. The first computing device 102 may be configured to execute a first client application 106 that presents a user interface. The first client application 106 may be provided by the ride hailing service 116. The first client application 106 may be implemented in computer instructions stored on one or more memory devices and executed by one or more processing devices of the first computing device 102. The first client application 106 may be a standalone application installed on the first computing device 102 or may be an application that is executed by another application (e.g., a website in a web browser).

The first computing device 102 may include a display that is capable of presenting the user interface of the first client application 106. The user interface may present screens pertaining to ride hailing that enable the passenger 103 to enter personal information (e.g., an image of their self ("selfie"), clothing type they are currently wearing, clothing color, accessory type they are currently wearing, gender, age, height, race, etc.), request rides to destinations, present directions guiding the first computing device 102 toward the second computing device 104, present directions of angles to turn the first computing device 102 and/or a body of the passenger 103 to increase a signal strength between the first computing device 102 and the second computing device 104, present detailed information about the driver 105 and/or a vehicle 109 driven by the driver 105, and/or present a notification that the driver 105 has been authenticated, among other things.

The second computing device 104 may be any suitable computing device, such as a smart phone, laptop, or tablet. The second computing device 104 may be configured to execute a second client application 108 that presents a user interface. The second client application 108 may be provided by the ride hailing service 116. The second client application 108 may be implemented in computer instructions stored on one or more memory devices and executed by one or more processing devices of the second computing device 104. The second client application 108 may be a standalone application installed on the second computing device 104 or may be an application that is executed by another application (e.g., a website in a web browser).

The second computing device 104 may include a display that is capable of presenting the user interface of the second client application 108. The user interface may present screens pertaining to ride hailing that enable the driver 105 to enter personal information (e.g., an image of their self ("selfie"), clothing type the driver is currently wearing, clothing color, accessory type the driver is currently wearing, gender, age, height, race, etc.) and/or vehicle (e.g., one or more images of the vehicle 109 at different perspectives (e.g., front and side elevation views), make, model, color, year, etc.), present ride requests from passengers within a certain vicinity, accept a ride request to a destination, present directions guiding the second computing device 104 toward the first computing device 102, present detailed information about the passenger 103, and/or present a notification that the passenger 103 has been authenticated, among other things.

The following describes an interaction between the first computing device 102 of the passenger 103, the server 118, and the second computing device 104 of the driver 105 in a ride hailing example situation, and in accordance with example embodiments. The passenger 103 is depicted with the first computing device 102, such as a smart phone. The first computing device 102 communicates initially with the server 118 of the ride hailing service 116, which in turn communicates with the second computing device 104 of the driver 105 in the vehicle 109. The server 118 may initially be a conduit of information between the passenger 103 and the driver 105.

The passenger 103, using the first computing device 102, initially requests a ride to a destination by communication with the server 118. The server 118 selects drivers in the area, and broadcasts the request. Once a driver 105 accepts, in the example system 100, tokens, unique numbers, and device types are exchanged securely between the first computing device 102 of the passenger 103 and the second computing device 104 of the driver 105 by way of the server 118.

In some embodiments, the first computing device 102 and the second computing device 104 may employ a cryptography technique (e.g., Rivest-Shamir-Adleman (RSA)) to encrypt/decrypt the data that is transmitted to each other. For example, when the driver 105 accepts, the first computing device 102 may transmit, using the server 118, its own public key to the second computing device 104, and the second computing device 104 may transmit, using the server 118, its own public key to the first computing device 102. In some embodiments, each data transmitted by the first computing device 102 may be encrypted using the public key of the second computing device 104, and the second computing device 104 may decrypt the encrypted data using its private key. Likewise, each data transmitted by the second computing device 104 may be encrypted using the public key of the first computing device 102, and the first computing device 102 may decrypt the encrypted data using its private key. In some embodiments, other techniques may be used to secure the data, such as Eddystone protocol that defines point-to-point communication channel message formats that are encrypted where just authorized applications may be enabled to decrypt the messages.

Returning to the ride hailing situation, a token may be issued by the driver 105 (more particularly, by the second computing device 104 of the driver 105), and the token is hereafter referred to as "Token-D." In some embodiments, the server 118 may generate Token-D. Similarly, a token is issued by the passenger 103 (more particularly, by the first computing device of the passenger) 103, and the token of the passenger 103 is hereafter referred to as "Token-P." The Token-D and Token-P may include any suitable information.

FIG. 2 shows, in block diagram form, Token-P 200 in accordance with at least some embodiments. The example Token-P 200 may include a Passenger ID 202, which may be assigned to the passenger 103 by the server 118 of the ride hailing service 116. The Passenger ID 202 may be unique during a single transaction or across several transactions. In example cases, a unique Passenger ID 202 will be issued by the server 118 of the ride hailing service 116, and will remain unique throughout the lifetime of the passenger's registration with the ride hailing service 116. The Location 204 in the Token-P 200 may be captured from the first computing device 102 in real-time or near real-time as coordinates. In example cases, the format of the Location 204 information may be location in Degrees, Minutes, and Seconds (DMS) (e.g., 40° 26' 46" N 79° 58' 56" W). The Destination 206 in the Token-P 200 may be the name of passenger's destination (in some cases restricted to 50 characters). Coordinates for the Destination 206 may be also be used in DMS format instead of destination name. The Timestamp 208 in the Token-P 200 may be server generated in server-based systems. In Peer-to-Peer systems the Timestamp may be extracted from the first computing device 102 of the passenger 103 in any suitable format (e.g., HH:MM:SS). In example cases, the Token-P length is not restricted, but in other cases the Token-P length may be limited to 200 characters or so.

FIG. 3 shows, in block diagram form, Token-D 300 in accordance with at least some embodiments. The example Token-D 300 may include a Driver ID 302, which may be assigned to each driver 105 by the ride hailing system 116. The Driver ID 302 may be a unique number during a single transactions or across several transactions. In example cases, a unique Driver ID 302 will be issued by the server 118 of the ride hailing service 116, and will remain unique throughout the lifetime of the driver's registration with the ride hailing service 116. The Location 304 in the Token-D 300 may be captured from the second computing device 104 of the driver 105 in real-time or near real-time. In example cases, the format of the Location 304 information may be location DMS. The Licence Plate information 306 in the Token-D 300 may be unique in operational geography, and may refer to the letters and numbers of the license plate of the vehicle operated by the driver 105, in some cases restricted to 20 characters. The Timestamp 308 in the Token-D 300 may be extracted from the second computing device 104 of the driver 105 in any suitable format (e.g., HH:MM:SS). As with the Token-P 200, the example Token-D 300 may have no length restrictions, but in other cases the Token-D 300 length may be limited to 200 characters or so.

Summarizing before continuing, in the example workflow the passenger 103 has requested a ride using the first client application 106 provided by the ride hailing service 116 to the first computing device 102, the driver 105 has accepted using the second client application 108 provided by the ride hailing service to the second computing device 104, and the passenger 103 and driver 105 (through their respective computing devices 102 and 104) have exchanged information in the form of Token-P 200 and Token-D 300. In example embodiments, additional information is exchanged in the form of unique information and device types.

The unique information provided from the first computing device 102 of the passenger 103 to the second computing device 104 of the driver 105 is referred to herein as Unique-P. And oppositely, the unique information provided from the second computing device 104 of the driver 105 to the first computing device 102 of the passenger 103 is referred to herein as Unique-D. In some embodiments, when the driver 105 accepts the ride using the second computing device 104, an indication may be provided to the first computing device 102 by the server 118 of the ride hailing service 116 that the driver 105 has accepted. In such an instance, the first computing device 102 may generate and/or transmit the Unique-P to the server 118 to be communicated to the second computing device 104, and the second computing device 104 may generate and/or transmit the Unique-D to the server 118 to be communicated to the first computing device 102. In some embodiments, the Unique-P and Unique-D may be encrypted in a similar manner as described above.

In example cases, the Unique-P number is a short number, with fewer characters than the Token-P 200, created using any suitable technology (e.g., hash functions) from some or all the Token-P information. In one example embodiment, the Destination information is converted to a number, and the Unique-P is created by using the number-based Destination 206 and Passenger ID 202 as seeds provided to a hash function. Passenger ID 202 is unique during a transaction. Destination 206 is highly likely to be unique, especially when destination coordinates are used. In any case, a random or apparently random number is generated, and thus Unique-P has an exceptionally high probability of being unique.

Turning now to the Unique-D. The Driver ID 302 information in the Token-D 300 is a unique number. Likewise, the Licence Plate information 306 is unique within an operational geography. In example cases, the License Plate information 306 is converted to a number. The Unique-D may thus be created by using the Driver ID 302 and the number-based License plate information. As with the Unique-P, the Unique-D may be created in any suitable form, such as using the number-based License Plate and Driver ID as seeds provided to a hash function.

In some embodiments, the Unique-P and Unique-D may be smaller in memory size than the Token-P and Token-D. The size of the Unique-P and Unique-D may be a few bytes or one byte, for example. Accordingly, power efficiency may be enhanced when transmitting the Unique-P and Unique-D, as less data is being transmitted during Unique-P and Unique-D communication. Such communication of the Unique-P and Unique-D may be beneficial for communicating between smart phones that have limited battery life (e.g., the first computing device 102 of the passenger 103, which may not be plugged into a power source when the ride request is made). As described below, the Token-P 200 and Token-D 300 may be communicated between the first and second computing device 102 and 104 when a determination is made that the first and second computing device 102 and 104 are within a certain distance from each other (e.g., satisfy a threshold distance condition).

In addition, some example embodiments further exchange information regarding the device type of the computing devices 102 and 104 of each of the driver and passenger when the driver accepts the ride request. Some computing devices (e.g., mobile computing devices) have differing radio frequency (RF) characteristics, and such characteristics may have an impact on received signal strength indication (RSSI) based distance calculations. To enable more accurate distance estimates, Device Model and Types are extracted by the first and second client application 106 and 108 running in each of the first and second computing devices 102 and 104 of the passenger 103 and driver 105. The Device Model and Types information may be exchanged during initial exchange of Tokens and Unique information. The ride hailing system 116 may maintain a "Device Knowledge Base" (DKB) in the database 117. The DKB has information about RF characteristics of each device, and the information may be used to improve distance estimate accuracies as the first and second computing devices 102 and 104 get closer to one another, which is discussed in more detail below.

In some embodiments, the Token-D, Unique-D, device type information pertaining to the second computing device 104, etc. that is received from the server 118 by the first computing device 102 may be stored in one or more memory device of the first computing device 102. In some embodiments, the Token-P, Unique-P, device type information pertaining to the first computing device 102, etc. that is received from the server 118 by the second computing device 104 may be stored in one or more memory device of the second computing device 104.

Figure 4:
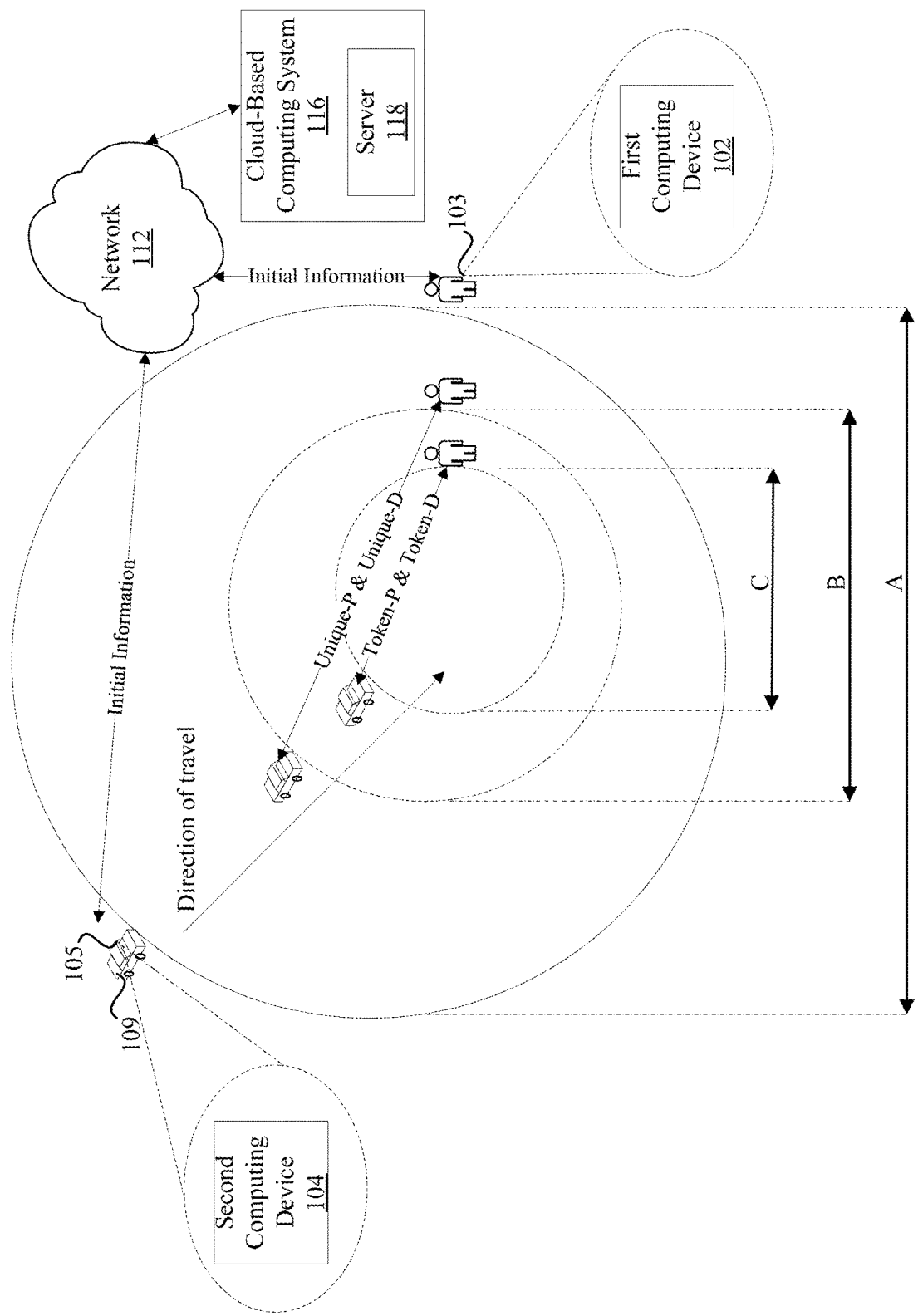
FIG. 4 shows a conceptual view of the communication zones during approach in accordance with at least some embodiments.

Directing the driver to the passenger, and oppositely directing the passenger to the driver, can be conceptually divided into several zones. Each zone may be defined based on a distance between the passenger 103 and the driver 105 (or more specifically, between the first computing device 102 of the passenger 103 and the second computing device 104 of the driver 105). FIG. 4 shows a conceptual view of the communication zones during approach, and in accordance with at least some embodiments. When the driver 105 accepts the ride request of the passenger 103, each of the first computing device 102 and the second computing device 104 may determine their respective location data (e.g., using a global positioning system (GPS)) and communicate that respective location data to each other (e.g., using the server 118). The first and second computing device 102 and 104 may use their own location data and the received location data of the other computing device to determine a distance between each other. When the determined distance satisfies various threshold distance conditions, different types of communication channels may be used and/or different types of data may be exchanged according to embodiments disclosed herein.

The depicted example shows that the driver 105 who accepted the ride request via the second computing device 104 is driving the vehicle 109 toward the requesting passenger 103, who is holding the first computing device 102, beginning at Zone A. Zone A may represent the driver and passenger being separated by a distance where point-to-point communication (also referred to herein as peer-to-peer communication) is not yet possible. An example threshold distance condition may be satisfied for Zone A when the distance between the first and second computing device 102 and 104 is greater than a certain amount (e.g., greater than 500 meters, etc.). The Zone A communications may take place by the second computing device 104 of the driver 105 communicating with the first computing device 102 of the passenger 103 using technologies such as data communications over a wireless cellular network (e.g., 4G) or data communication over a wide-area network (e.g., WIFI).

When the driver and passenger are separated by such an example distance, the respective first and second computing device 102 and 104 may exchange initial information (e.g., tokens, unique information, device type) using the server 118 via the network 112 after the driver accepts the ride request. Further, each computing device 102 and 104 may continue to communicate their respective location data with each other using the Zone A communication. Since each computing device 102 and 104 are transmitting their location data to each other, the passenger 103 may monitor in real time the driver's progress toward the pickup location, and similarly the driver 105 may monitor the passenger's location in case the passenger 103 voluntarily or involuntarily is forced to relocate.

In many cases, the Zone A communication may continue until a different, shorter range communication (e.g., point-to-point communication) can be established between the first and second computing device 102 and 104. For example, the respective first and second computing device 102 and 104 may continue to determine the distance between each other, which may be used to determine when another threshold distance condition is satisfied. In some embodiments, using the point-to-point communication channel in Zone B, a received signal strength indication (RSSI), in addition to the location data, may be used by each of the first and second computing device 102 and 104 to more accurately determine the distance between each other.

When both the driver and the passenger are sufficiently close, the respective computing devices 102 and 104 may begin advertising to establish a point-to-point communication channel, a Zone B communication. For example, when the second computing device 104 of the driver 105 and the first computing device 102 of the passenger 103 are within 500 meters, the respective computing device may begin broadcasting unique information (depicted as Unique-P and Unique-D in bi-directional arrow connecting the first and second computing devices 102 and 104 at Zone B) to attempt to establish direct communication. That is, when the distance between the first and second computing device 102 and 104 satisfy a threshold distance condition (e.g., less than 500 meters, 250 meters, 50 meters, etc.), then the respective unique information may be broadcast by the first and second computing device 102 and 104. The actual distance at which the two devices may establish a direct point-to-point communication channel varies based on a host of factors.

In example situations, the Zone B communications may take place when the respective devices are within about 50 meters, over protocols such as BLE, UWB, or the like. The attempts to establish Zone B communications may take place by each mobile device broadcasting the respective unique information. In some example cases, the second computing device 104 of the driver 105 broadcasts the Unique-D previously provided (and in some cases the Unique-D encrypted with the passenger's public key). Similarly, the second computing device 104 of the passenger 103 broadcasts the Unique-P previously provided (and in some cases the Unique-P encrypted with the driver's public key). Zone A communications may continue during the broadcasting of the Unique information until the Zone B communications are established. Once the Zone B communications are established, the Zone A-based communications may cease.

During Zone B communications, the first and second computing devices 102 and 104 may exchange similar information to the Zone A communications, but using the new connection. For example, each of the first and second computing device 102 and 104 may exchange respective location data with each other. Thus, the passenger 103 may monitor the driver's progress toward the pickup location (e.g., by receiving the GPS based location information), and similarly the driver 105 may monitor the passenger's location (e.g., by receiving the GPS based location information). In some embodiments, the Zone B communication may continue until a different, even shorter range communication can be established between the devices.

The example Zone B communication schemes also enable better directional navigation or direction finding for both the passenger and driver, though the driver may be constrained by roadways. In particular, the Zone B communication schemes enable at least two angle detection systems, where the angle detection systems help establish a direction for the passenger 103 (and in appropriate situations, the driver 105) to proceed to find each other. The angle detection systems are further described below with reference to FIGS. 11 and 12.

When the second computing device 104 of the driver 105 and the first computing device 102 of the passenger 103 satisfy another threshold distance condition by being less than a certain distance (e.g., less than 5 meters) from each other, the point-to-point communication channel (e.g., BLE, UWB) may continue to be used in Zone C communications and tokens (depicted as Token-P & Token-D on the bi-directional arrow between the first and second computing device 102 and 104 at Zone C) may be exchanged. For example, the second computing device 104 may communicate the Token-D to the first computing device 102 and the first computing device 102 may communicate the Token-P to the second computing device 104. Each of the first and second computing device 102 and 104 may compare the received token to the respective token initially received when the ride was accepted by the driver 105. If the tokens are verified by each respective computing device 102 and 104 with Zone C, each of the first and second computing device 102 and 104 may perform various operations to indicate to the passenger 103 and the driver 105 that authentication is successful and they are in vicinity to one another. These operations are discussed further below with reference to FIG. 10. Location data of each computing device 102 and 104 may continue to be exchanged with each other to guide the computing devices 102 and 104 together in Zone C.

In some embodiments, when both the second computing device 104 of the driver 105 and the first computing device 102 of the passenger 103 are sufficiently close, the respective computing devices 102 and 104 may begin advertising a second point-to-point communication channel that is an even shorter range communication in Zone C. For example, when the driver 105 and passenger 103 are within five meters or one meter, the respective computing devices 102 and 104 may begin broadcasting to attempt to establish direct communication via the second point-to-point communication channel. The actual distance at which the two devices may establish the next direct communication channel varies based on a host of factors. In example situations, the Zone C communications may take place with the respective devices are within about one meter, over protocols such as Near Field Communication (NFC), UWB, or the like. In these embodiment authentication situations, the second computing device 104 of the driver 105 and the first computing device 102 of the passenger 103 device may be touched together, and Tokens and/or Unique number's exchanged (possibly in encrypted form). If the information is authenticated, each of the first computing device 102 and the second computing device 104 may so indicate.

Additional aspects for passenger security may include that if the passenger 103 is within two meters of the driver 105, and authentication has not taken place, and the passenger 103 starts moving at a certain car driving speed, local security forces and/or law enforcement agencies may be alerted (e.g., kidnapping). The passenger's moving speed may be detected using sensors of the first computing device 102 and/or GPS signals.

In some embodiments, when the battery of the first computing device 102 of the passenger 103 falls below a certain level, a potential outage of passenger's computing device 102 may be communicated to the second computing device 104 of the driver 105. If communication between the first and second computing device 102 and 104 is lost, the second computing device 104 of the driver 105 may wait an extra amount of time for the first computing device 102 of the passenger 103 to respond. Duration of the extra time (e.g., 5 minutes, 10 minutes, etc.) may be agreed upon during the first handshake.

In some embodiments, the passenger 103 and the driver 105 may be within Zone B when the passenger 103 uses the first computing device 102 to request a ride. In such an instance, the tokens, unique information, and/or device types may be exchanged, via a cellular or WiFi network, between the first and second computing device 102 and 104 using the server 118. The first and second computing device 102 and 104 may exchange location data and determine that their distance from each other satisfies the threshold distance condition pertaining to Zone B. Accordingly, each of the first and second computing device 102 and 104 may broadcast their unique information to establish point-to-point communication. The first and second computing device 102 and 104 may exchange location data over the point-to-point communication to enable guiding the devices toward each other until another threshold distance condition is satisfied for Zone C, at which point the tokens may be exchanged between the first and second computing device 102 and 104 to perform authentication.

Figure 5:
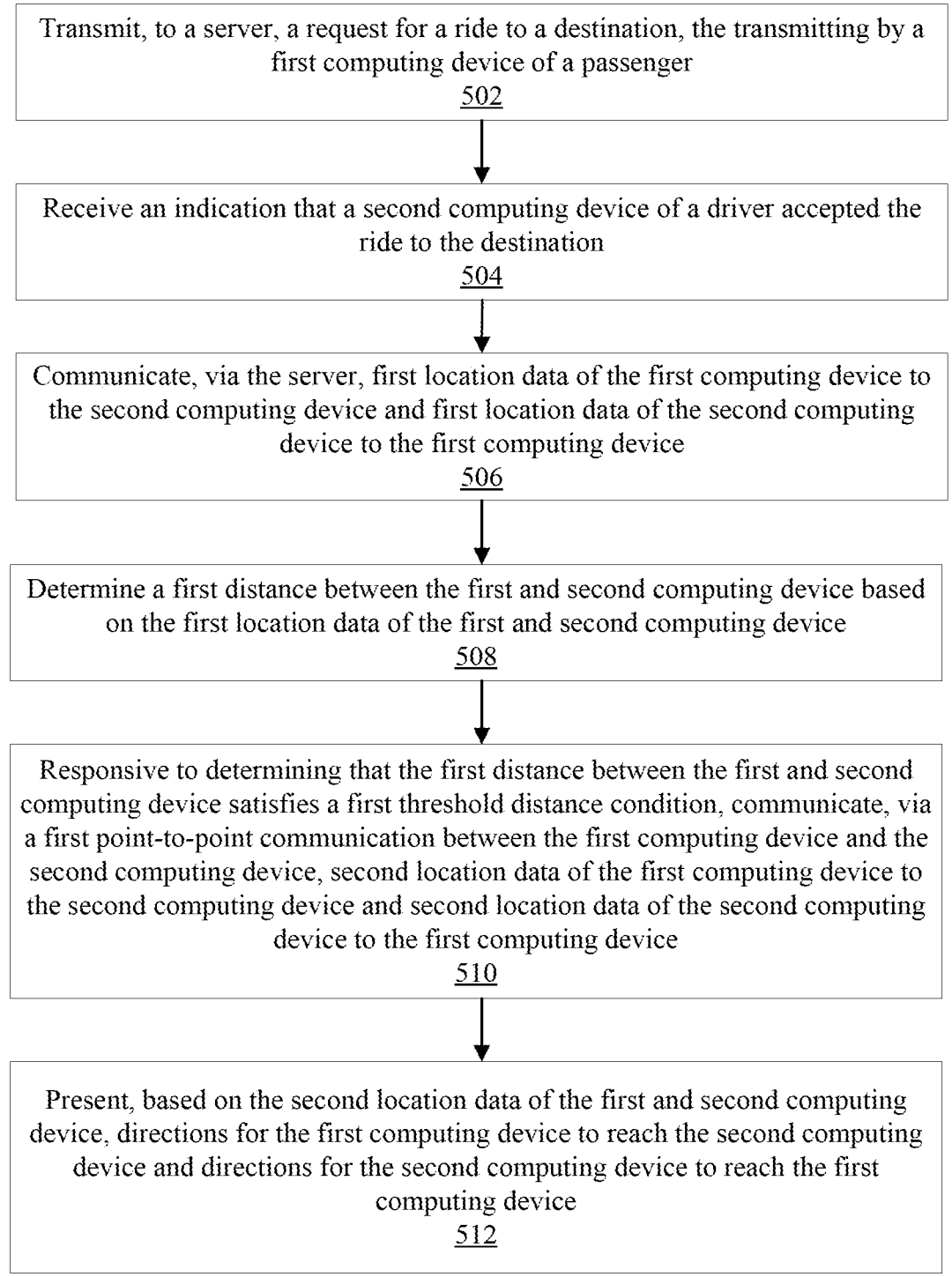
FIG. 5 shows an example method for guiding computing devices toward each other using a threshold distance condition.
Figure 6:
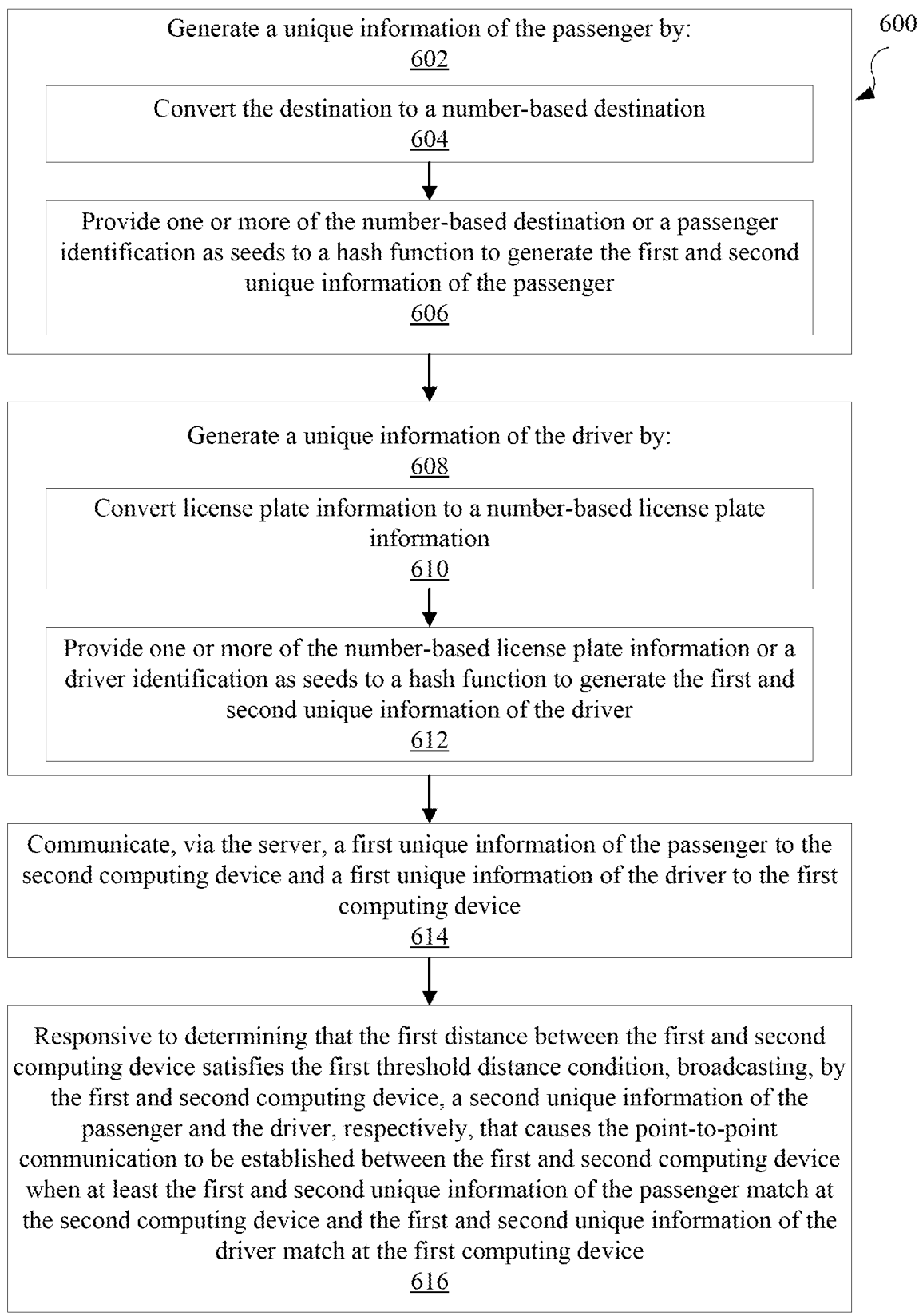
FIG. 6 shows an example method for establishing a point-to-point communication between two computing devices using unique information for a passenger and a driver in accordance with at least some embodiments.
Figure 9:
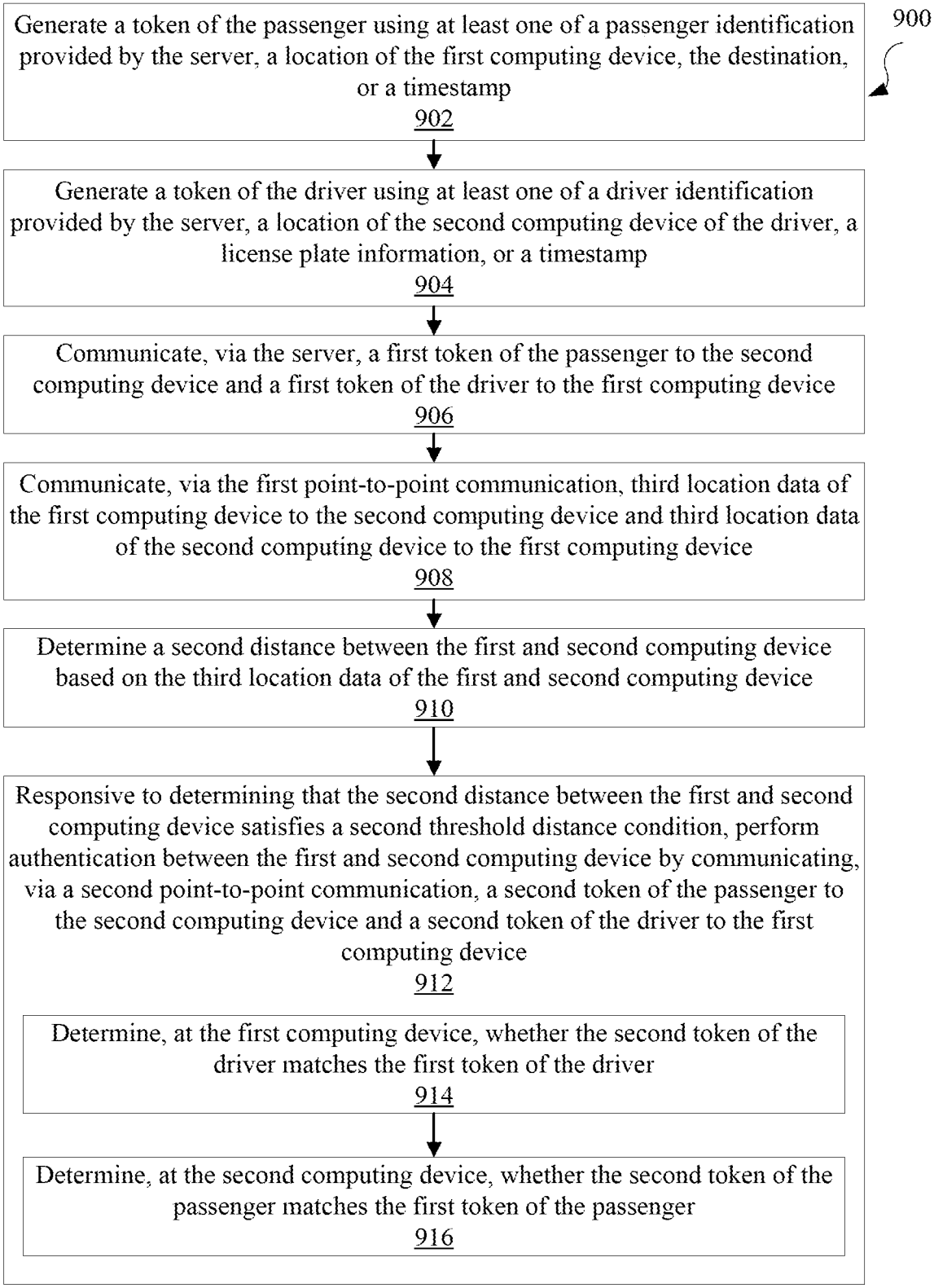
FIG. 9 shows an example method for performing authentication between a passenger and a driver using tokens in accordance with at least some embodiments.
Figure 12:
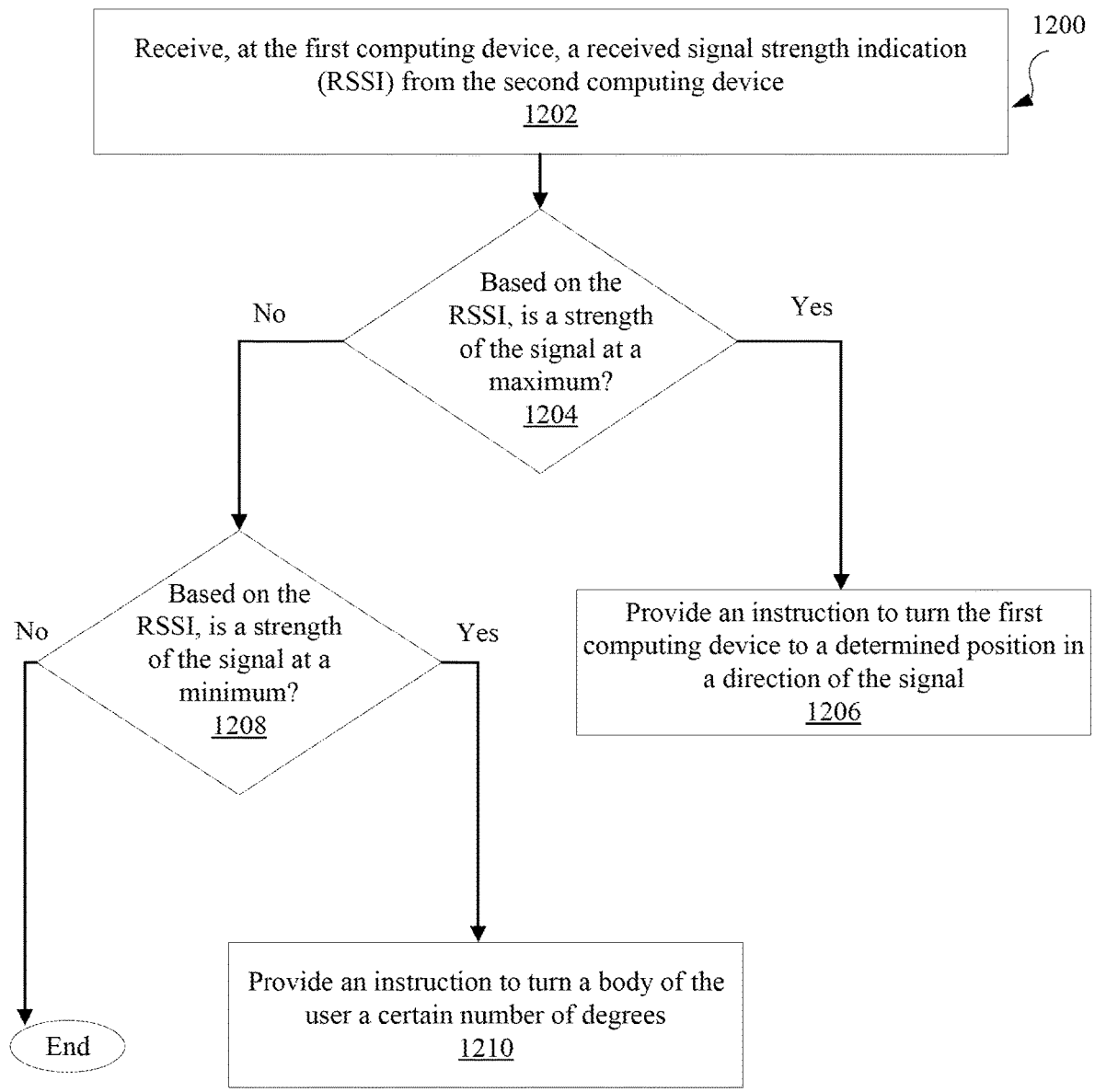
FIG. 12 shows an example method for using a received signal strength indication to improve direction information in accordance with at least some embodiments.
Figure 13:
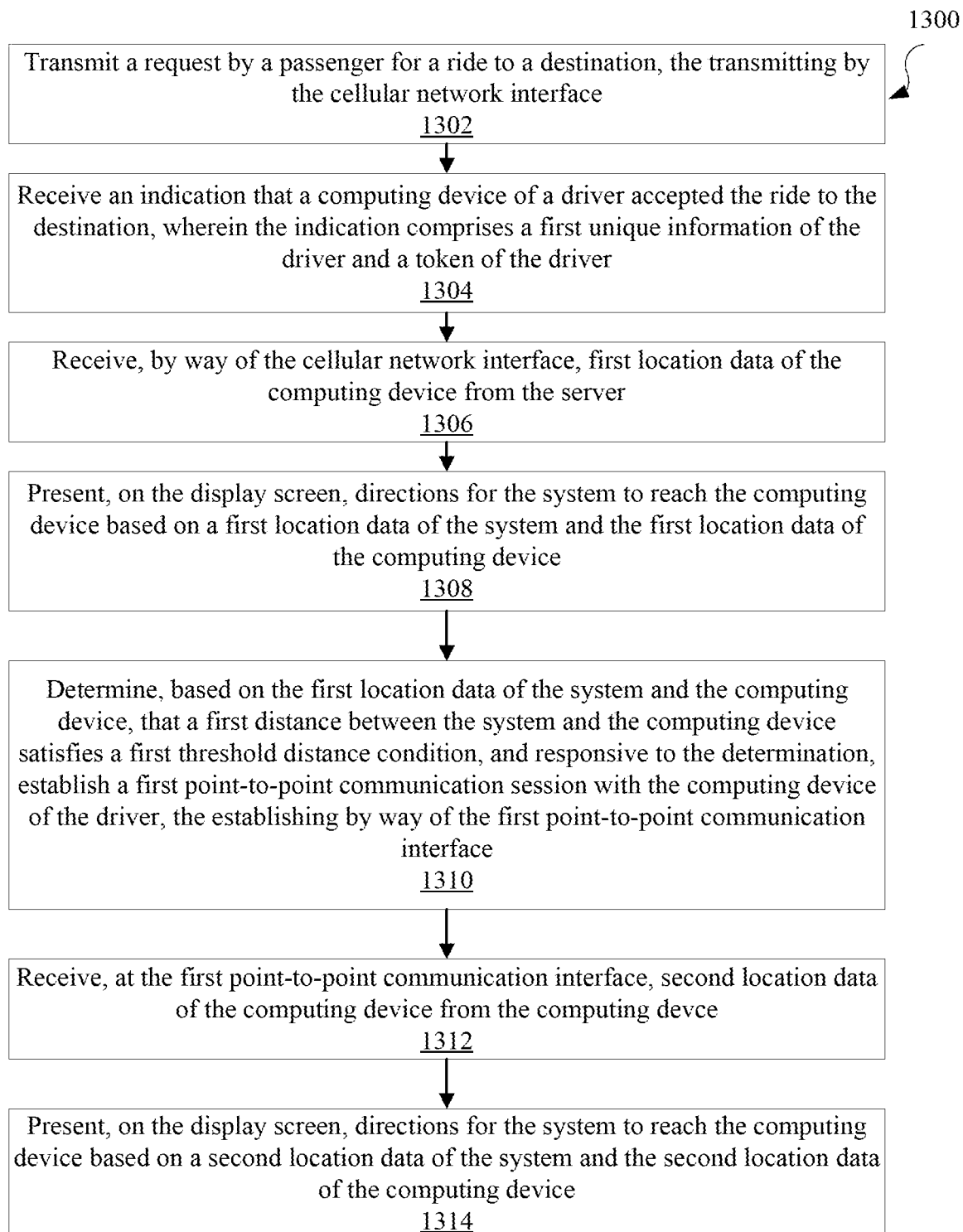
FIG. 13 shows an example method for a system of a passenger in a ride hailing situation in accordance with at least some embodiments.

Transitioning now to various methods, FIG. 5 depicts a method for computing devices 102 and 104 to communicate with each other via a server and then a first point-to-point communication to guide each other together. FIG. 6 provides additional details regarding the exchange of unique information to establish the first point-to-point communication. FIG. 9 provides additional details regarding the exchange of tokens and authentication via a second point-to-point communication. FIG. 12 shows a method for various angle detection systems. FIG. 13 shows a system for the first computing device 102 using a point-to-point communication to find the second computing device 104 and securely authenticating with the second computing device 104.

With regard to FIG. 5, an example method 500 is shown for guiding computing devices 102 and 104 toward each other using a threshold distance condition. The method 500 may be performed by processing logic that may include hardware (circuitry, dedicated logic, etc.), firmware, software, or a combination of both. The method 500 and/or each of their individual functions, subroutines, or operations may be performed by one or more processors of one or more of the devices in FIG. 1 (e.g., computing device 102, computing device 104, ride hailing service 116 including servers 118) implementing the method 500. The method 500 may be implemented as computer instructions that, when executed by a processing device, execute the operations. In certain implementations, the method 500 may be performed by a single processing thread. Alternatively, the method 500 may be performed by two or more processing threads, each thread implementing one or more individual functions, routines, subroutines, or operations of the method 500.

At block 502, a request for a ride to a destination may be transmitted by the first computing device 102 of the passenger 103 to a server 118. The request may be selected by the passenger 103 using the first client application 106 provided by the ride hailing service 116 to the first computing device 102. The destination may be the name of the passenger's destination and/or coordinates for the destination may be used in Degrees, Minutes, Seconds (DMS) format. In some embodiments, the first and second computing device 102 and 104 may be separated by a distance that satisfies the threshold distance condition (e.g., greater than 500 meters) for Zone A communication. Accordingly, the first and second computing device 102 and 104 may communicate with each other using the server 118 via the network 112 (e.g., cellular network).

At block 504, an indication may be received by the first computing device 102 of the passenger 103, where the indication specifies that the second computing device 104 of the driver 105 accepted the ride to the destination. The indication may be received from the server 118 of the ride hailing service 116.

At block 506, first location data of the first computing device 102 may be communicated via the server 118 to the second computing device 104 and first location data of the second computing device 104 may be communicated via the server 118 to the first computing device 102. Each of the first and second computing device 102 and 104 may determine the first location data using respective GPS and the location data may be represented as coordinates the DMS format.

At block 508, a first distance between the first and second computing device 102 and 104 may be determined based on the first location data of the first and the second computing device 102 and 104. For example, the first computing device 102 may receive the first location data of the second computing device 104 and determine the distance using its own first location data and the received second computing device location data. The second computing device 104 may receive the first location data of the first computing device 102 and determine the distance using its own first location data and the received first computing device location data. In some embodiments, each of the first and second computing device 102 and 104 may use a received signal strength indicator (RSSI) to determine the distance between each other.

At block 510, responsive to determining that the first distance between the first computing device 102 and the second computing device 104 satisfies a first threshold distance condition, second location data of the first computing device 102 may be communicated, via a first point-to-point communication (e.g., BLE, UWB) between the first computing device 102 and the second computing device 104, to the second computing device 104, and second location data of the second computing device 104 may be communicated, via the first point-to-point communication, to the first computing device 102. In some embodiments, the first threshold distance condition may pertain to the Zone B communication and may be satisfied when the first and second computing device 102 and 104 are within 50 meters from each other, for example. When the point-to-point communication is established in Zone B, the Zone A communication using an intervening device (e.g., the server 118) may cease.

At block 512, directions for the first computing device 102 to reach the second computing device 104 and directions for the second computing device 104 to reach the first computing device 102 may be presented based on the second location data of the first computing device 102 and the second computing device 104. That is, directions to reach the second computing device 104 may be presented by a display of the first computing device 102, and directions to reach the first computing device 102 may be presented by a display of the second computing device 104.

FIG. 6 shows an example method 600 for establishing a point-to-point communication between two computing devices 102 and 104 using unique information for a passenger 103 and a driver 105 in accordance with at least some embodiments. Method 600 includes operations performed by one or more processing devices of one or more devices (e.g., first computing device 102, second computing device 104, servers 118 of ride hailing service 116) of FIG. 1. The method 600 may be performed in the same or a similar manner as described above in regards to method 500.

At block 602, a unique information of the passenger 103 may be generated by performing blocks 604 and 606. The unique information of the passenger 103 may be generated by the first computing device 102 and/or the server 118 of the ride hailing service 116. At block 604, the Destination 206 of Token-P 200 may be converted to a number-based destination. At block 606, one or more of the number-based destination or a Passenger ID 202 may be provided as seeds to a hash function to generate the unique information of the passenger 103. The unique information of the passenger 103 may be stored in a memory device of the first computing device 102. The first computing device 102 may transmit a first unique information of the passenger 103 to the server 118 when the passenger 103 registers with the ride hailing service 116. The first unique information of the passenger 103 may be a copy of the unique information of the passenger 103 stored at the first computing device 102.

At block 608, a unique information of the driver 105 may be generated by performing blocks 610 and 612. The unique information of the driver 105 may be generated by the second computing device 104 and/or the server 118 of the ride hailing service 116. At block 610, the License Plate information 306 may be converted to a number-based license plate information. At block 612, one or more of the number-based license plate information or a Driver ID 302 may be provided as seeds to a hash function to generate the unique information of the driver 105. The unique information of the driver 105 may be stored in a memory device of the second computing device 104. The second computing device 104 may transmit a first unique identifier of the driver 105 to the server 118 when the driver 105 registers with the ride hailing service 116. The first unique information of the driver 105 may be a copy of the unique information of the driver 105 stored at the second computing device 104.

At block 614, the first unique information of the passenger 103 may be communicated, via the server 118, to the second computing device 104, and a first unique information of the driver 105 may be communicated, via the server 118, to the first computing device 102. This exchange of unique information may occur in response to the driver 105 accepting a ride requested by the passenger 103 to a destination. Other information may be exchanged between the computing devices 102 and 104 at this time, such as the tokens and device types, as described further herein.

At block 616, responsive to determining that the first distance (determined at block 508 of FIG. 5) between the first and second computing device 102 and 104 satisfies the first threshold distance condition, the first and second computing device 102 and 104 may broadcast a second unique information of the passenger 103 and the driver 105, respectively, that causes the point-to-point communication to be established between the first and second computing device 102 and 104 when at least the first and second unique information of the passenger 103 match at the second computing device 104 and the first and second unique information of the driver 105 match at the first computing device 102. The second unique information for the passenger 103 and the driver 105 may be the same as the first unique information for the passenger 103 and the driver 105.

Figure 11:
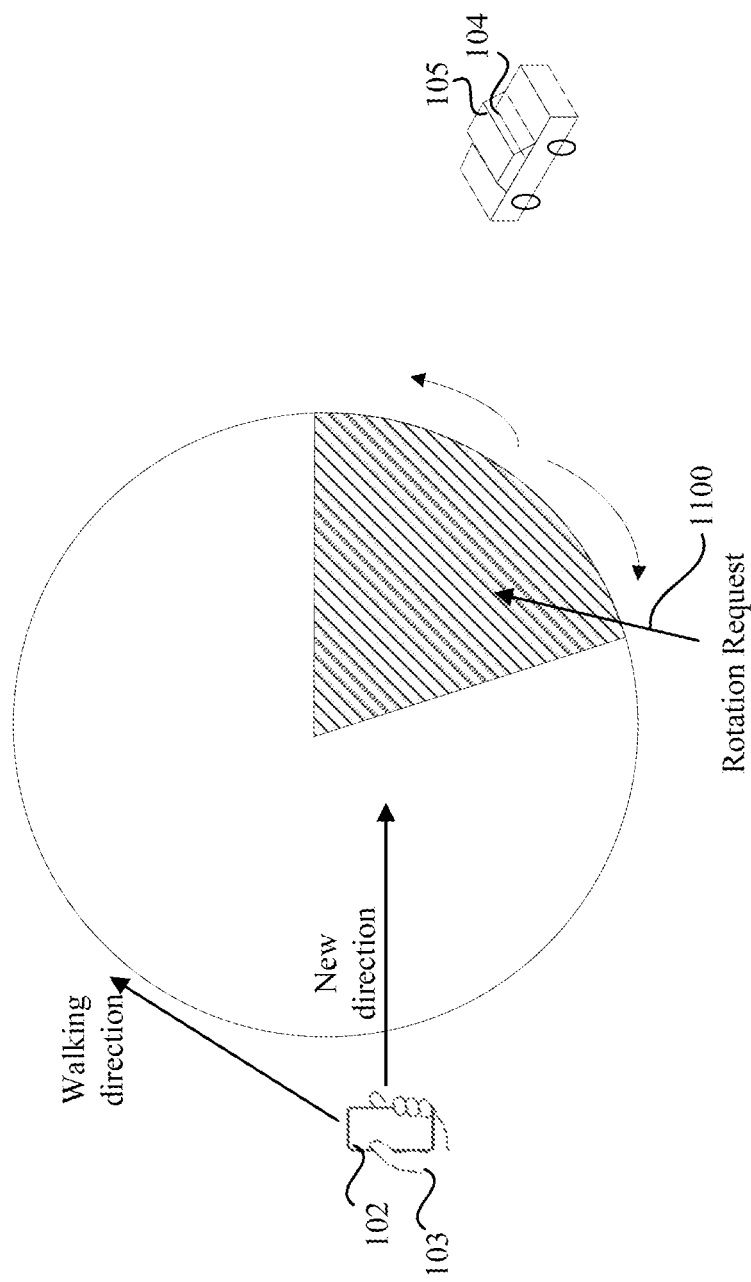
FIG. 11 shows an example of full or partial turning to improve direction information in accordance with at least some embodiments.

In some embodiments, when the first and second computing device 102 and 104 detect the second unique information and establish the point-to-point communication (e.g., within Zone B communication), one or more angle detection systems may be used to enhance guiding the first and second computing devices 102 and 104 toward each other, as described further with regard to FIGS. 11 and 12. Further, the first computing device 102 may present, via a user interface of the first client application 106, certain information pertaining to the vehicle 109 and/or the driver 105, and directions toward the driver 105.

Figure 7:
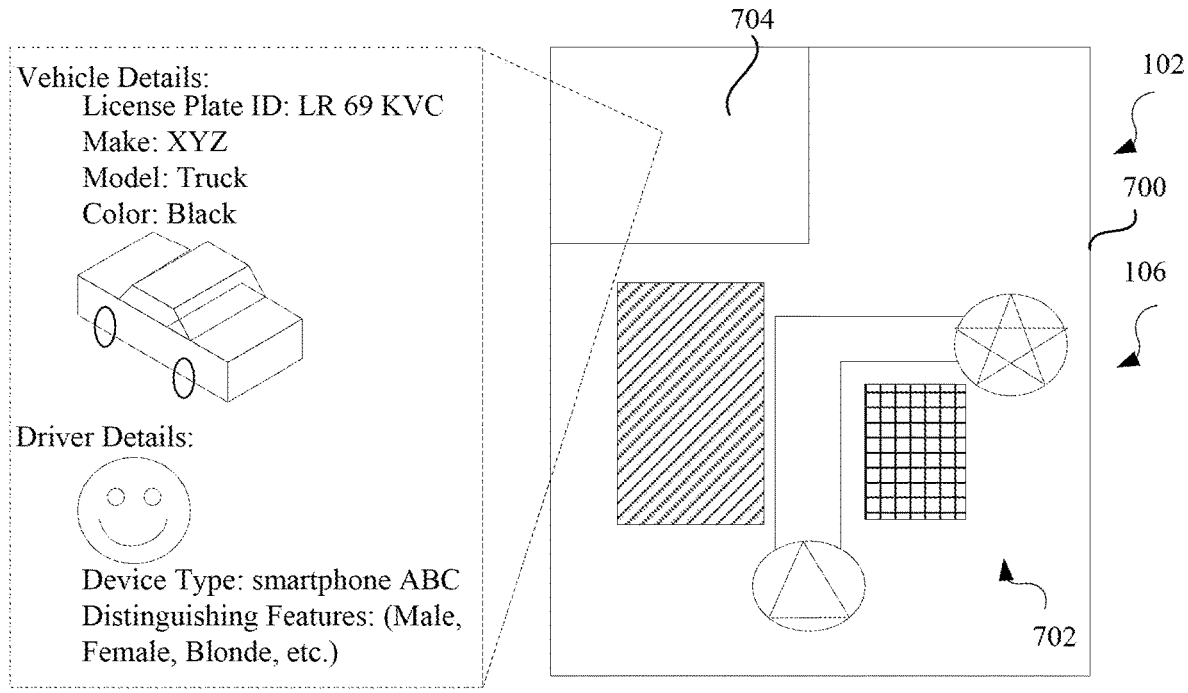
FIG. 7 shows an example user interface for vehicle and driver information presented on a computing device of a passenger in accordance with at least some embodiments.

For example, FIG. 7 shows an example user interface 700 for vehicle and driver information presented on the computing device 102 of the passenger 103 in accordance with at least some embodiments. In particular, the user interface 700 may be presented by the first client application 106 executing on the first computing device 102. As depicted, the user interface 700 may include a portion 702 that present directions for the first computing device 102 (represented as the triangle) to reach the second computing device 104 (represented as the star). In some embodiments, the user interface 700 may also present a distance remaining to the second computing device 104. Further, as depicted, a second portion 704 may be presented in the user interface 700 that includes further details pertaining to the vehicle 109 and/or the driver 105.

The vehicle details may include a "License Plate ID: LR 69 KVC," "Make: XYZ," "Model: Truck," "Color: Black," and/or an image of the vehicle from one or more views (e.g., a front view, side view, perspective view, top view, etc.), among other things. The driver details may include an image of the driver 105 provided by the driver 105, obtained from storage, or an avatar. The driver details may also include "Device Type: smartphone ABC," and/or "Distinguishing Features: (Male, Female, Blonde, etc.)," among other things.

Figure 8:
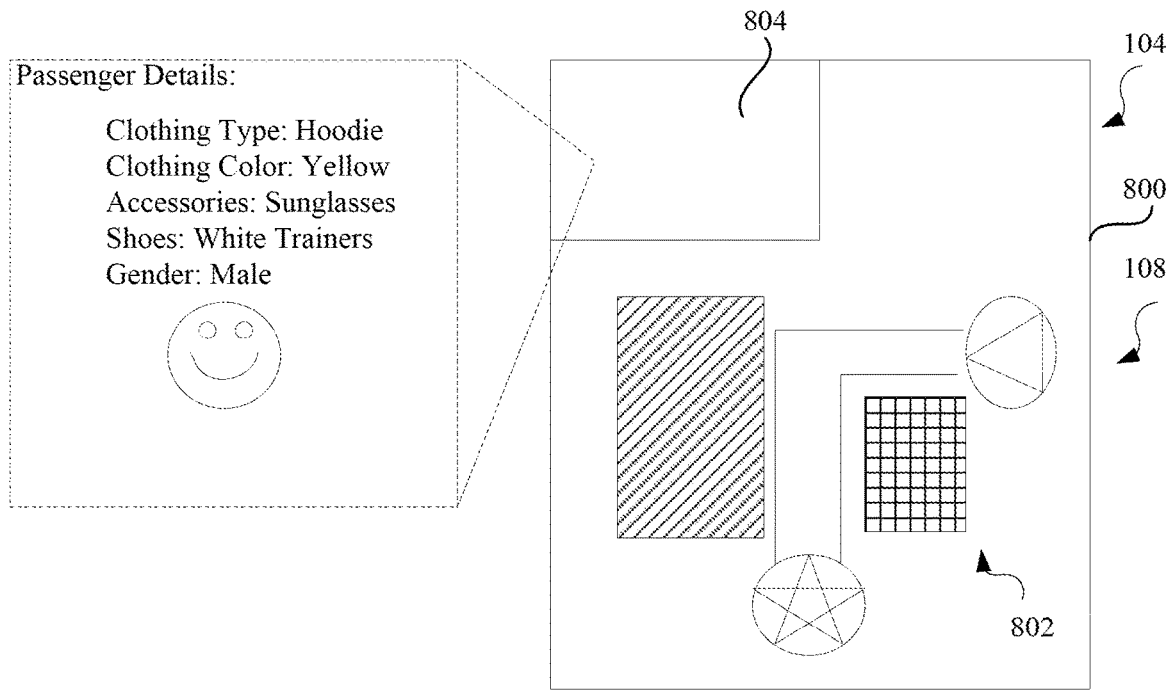
FIG. 8 shows an example user interface for passenger information presented on a computing device of a driver in accordance with at least some embodiments.

In some embodiments, the second computing device 104 may present, via a user interface of the second client application 108, certain information pertaining to the passenger 103, and directions toward the passenger 103. FIG. 8 shows an example user interface 800 for passenger information presented on the second computing device 104 of a driver 105 in accordance with at least some embodiments. In particular, the user interface 800 may be presented by the second client application 108 executing on the second computing device 104. As depicted, the user interface 800 may include a portion 802 that present directions for the second computing device 104 (represented as the triangle) to reach the first computing device 102 (represented as the star). In some embodiments, the user interface 800 may also present a distance remaining to the first computing device 102. Further, as depicted, a second portion 804 may be presented in the user interface 800 that includes further details pertaining to the passenger 103. The passenger details may include a "Clothing Type: Hoodie," "Clothing Color: Yellow," "Accessories: Sunglasses," "Shoes: White Trainers," "Gender: Male," and/or a current or old image of the passenger 103 uploaded by the passenger 103, among other things.

FIG. 9 shows an example method 900 for performing authentication between a passenger 103 and a driver 105 using tokens (e.g., Token-P 200 and Token-D 300 in accordance with at least some embodiments. Method 900 includes operations performed by one or more processing devices of one or more devices (e.g., first computing device 102, second computing device 104, servers 118 of ride hailing service 116) of FIG. 1. The method 900 may be performed in the same or a similar manner as described above in regards to method 500.

At block 902, a token, Token-P 200, of the passenger 103 may be generated using at least one a passenger identification (Passenger ID 202) provided by the server 118 of the ride hailing service 116, Location 204 of the first computing device 102, Destination 206, and/or Timestamp 208. The Token-P 200 of the passenger 103 may be generated by the first computing device 102 and/or the server 118 of the ride hailing service 116 when the request for the ride to the destination is made or when the ride is accepted by the driver 105. The Token-P 200 of the passenger 103 may be stored in a memory device of the first computing device 102. A first Token-P may be transmitted to the server 118 when the request for the ride to the destination is made or when the driver 105 accepts the ride request. The first Token-P of the passenger 103 may be a copy of the Token-P 200 of the passenger 103 stored at the first computing device 102.

At block 904, a token, Token-D 300, of the driver 105 may be generated using at least one a driver identification (Driver ID 302) provided by the server 118 of the ride hailing service 116, Location 304 of the second computing device 104 of the driver 105, License Plate information 306 of the vehicle 109, and/or Timestamp 308. The Token-D 300 of the driver 105 may be generated by the second computing device 104 and/or the server 118 of the ride hailing service 116 when the request for the ride to the destination is accepted. The Token-D 300 of the driver 105 may be stored in a memory device of the second computing device 104. A first Token-D may be transmitted to the server 118 when the driver 105 accepts the ride request. The first Token-D of the driver 105 may be a copy of the Token-D 300 of the driver 105 stored at the second computing device 104.

At block 906, the first Token-P 200 of the passenger 103 may be communicated, via the server 118, to the second computing device 104, and a first Token-D 300 of the driver 105 may be communicated, via the server 118, to the first computing device 102. This exchange of tokens may occur in response to the driver 105 accepting a ride requested by the passenger 103 to a destination. Other information may be exchanged between the computing devices 102 and 104 at this time, such as the unique information (described above) and device types.

In some embodiments, the first and second computing device 102 and 104 may change distances from satisfying a threshold distance condition (e.g., distance is greater than 500 meters) associated with Zone A to satisfying a threshold distance condition (e.g., distance is less than 50 meters) associated with Zone B. For example, as previously described with reference to the method 600 of FIG. 6, the first distance between the first and second computing device 102 and 104 satisfied the first threshold distance condition and the first and second computing device 102 and 104 are communicating via the first point-to-point communication.

Returning to the method 900 of FIG. 9, at block 908, third location data of the first computing device 102 may be communicated, via the first point-to-point communication, to the second computing device 104, and third location data of the second computing device 104 may be communicated, via the point-to-point communication, to the first computing device 102. The third location data of the first and second computing device 102 and 104 may be GPS coordinates. In some embodiments, an RSSI may be detected by both the first and second computing device 102 and 104.

At block 910, a second distance between the first and second computing device 102 and 104 may be determined based on the third location data of the first and second computing device 102 and 104. In some embodiments, the second distance may also be determined based on the RSSI, which can enhance determining how close the first and second computing device 102 and 104 are to each other. In some embodiments, a determination may be made whether the second distance satisfies a second threshold distance condition (e.g., less than 5 meters) that is associated with Zone C communication.

At block 912, responsive to determining that the second distance between the first and second computing device 102 and 104 satisfies a second threshold distance condition, authentication may be performed between the first and second computing device 102 and 104 by communicating, via a second point-to-point communication (e.g., BLE, UWB, NFC), a second Token-P 200 of the passenger 103 to the second computing device 104 and a second Token-D 300 of the driver to the first computing device 102. In some embodiments, the second Token-P may be a copy of the Token-P stored in the memory device of the first computing device 102, or the second Token-P may be generated on the fly. In some embodiments, the second Token-D may be a copy of the Token-D stored in the memory device of the second computing device 104. The first and second Token-Ps may be the same, and the first and second Token-Ds may be the same.

Performing authentication may include the blocks 914 and 916. At block 914, the first computing device 102 may determine whether the second Token-D 300 of the driver 105 matches the first Token-D 300 of the driver. At block 916, the second computing device 104 may determine whether the second Token-P 200 of the passenger 103 matches the first Token-P 200 of the passenger 103. If the tokens match at both computing device 102 and 104, then authentication is successful.

As described above, in some embodiments, tokens may be exchanged when the computing devices 102 and 104 are touched together by using NFC or UWB communication at a shorter range (e.g., centimeters). In any case, when authentication is successful, various operations may be performed.

Figure 10:
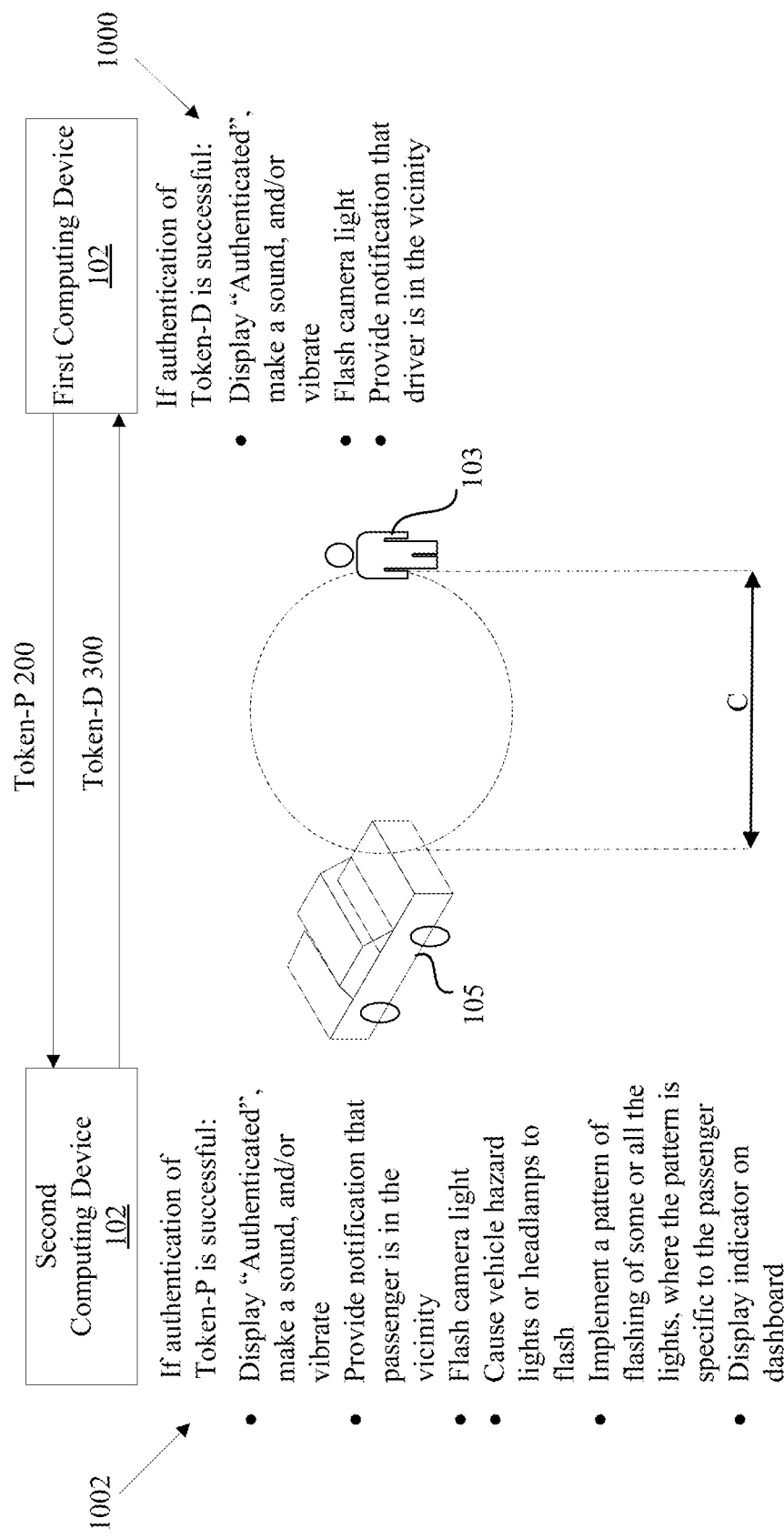
FIG. 10 shows example operations that may be performed in response to successful authentication in accordance with at least some embodiments.

For example, FIG. 10 shows example operations that may be performed in response to successful authentication in accordance with at least some embodiments. As depicted, the passenger 103 and the driver 105 are within a distance that satisfies the threshold distance condition (e.g., less than 5 meters) for Zone C communication over a point-to-point communication (e.g., BLE, UWB, NFC). As such, the first computing device 102 communicates the Token-P 200 to the second computing device 102, and the second computing device 104 communicates the Token-D 300 to the first computing device 102. The tokens may be matched with tokens previously received from the server 118 at each of the first and second computing device 102 and 104 to successfully authenticate the passenger 103 and the driver 105.

In some embodiments, as depicted by list 1000, the first computing device 102 of the passenger 103 may present "Authenticated," make a sound, and/or vibrate. As depicted by list 1002, the second computing device 104 of the driver 105 may display "Authenticated," make a sound, and/or vibrate. In some cases displaying "Authenticated" on both devices will be sufficient. Optionally, additional actions may take place. As further depicted in the list 1000, the first computing device 102 may flash its camera lights; provide a notification that the driver 105 is in the vicinity.

As further depicted in the list 1002, the second computing device 104 may take one or more of the following actions: provide notification to the driver 105 that the passenger 103 is in vicinity; and the driver's mobile computing device flashes its camera light. In cases where the second computing device 104 is in communication with the vehicle's controller area network (CAN) bus, the second computing device 104 may take one or more of the following actions: turn on the vehicle hazard lights; flash the vehicles head lamps; implement a pattern of flashing of some or all the lights, where the pattern is specific to the passenger 103.

FIG. 11 shows an example of full or partial turning to improve direction information in accordance with at least some embodiments. The direction information may be provided by one or more angle detection systems executed by the first client application 106 of the first computing device 102 and/or the second client application 108 of the second computing device 104. The angle detection systems may be used while during Zone B communication, and the angle detection systems help establish a direction for the passenger 103 (and in appropriate situations, the driver 105) to proceed to find each other. The angle detection systems may minimize user disturbance by minimizing requests for the passenger 103 to turn around.

In one example, the wide area around each first and second computing device 102 and 104 is scanned, and the passenger 103 may be directed to turn the first computing device 102 to detect the 'maximum' signal according to a received signal strength indication (RSSI) calculated by the first computing device 102. As device types of the first and second computing devices 102 and 104 have been shared with each other, using RF signal properties of each computing device 102 and 104, the direction algorithm improves 'direction' and 'distance' estimates, in some cases based on RSSI alone. The system may calculate the direction in real-time. The passenger may be asked to walk and rotate the device a few times as the algorithm continuously estimates and re-estimates a direction of the target. This real-time estimation and re-estimation is helpful in situations where the driver may have to drive the vehicle from its current position. Additionally the passenger, while walking, may come across an obstacle and temporarily change direction. The system therefore estimates and re-estimates in real-time current direction for both the passenger 103 and the driver 105.

The example algorithm may also identify the 'minimum' signal using the RSSI measurements. The minimum signal from the second computing device 104 of the driver 105 occurs when the passenger's body is between the first computing device 102 of the passenger 103 and that of the driver 105, as the human body absorbs most of the signal. When the minimum signal is detected, the passenger 103 is directed to turn 180 degrees so as to take own body out of the signal path.

In some cases it may be inconvenient for the passenger 103 to turn as directed while walking. Thus, in other example embodiments the algorithm may be designed and constructed to request at least some turning of the passenger 103 while stationary. For example, if the passenger 103 is walking and the signal is getting stronger, no passenger rotation is requested. When the signal strength starts diverging from an expected strength, the first and/or second computing device 102 and 104 may calculate an expected direction based on previous signal strengths, and the passenger 103 is directed to rotate (rotation request 1100) only around expected strong signal areas (as shown by the shaded area in FIG. 11). As example systems may constantly check signal strength, the scan area is constantly reduced to cause minimal inconvenience to the passenger 103. In the case of two computing devices 102 and 104 converging, the signals between the two are strong and therefore the request for turning will be reduced or eliminated. Further, expected improvements to Zone B communication protocols (e.g., BLUETOOTH 5.1, and UWB) will include directional services for angle of arrival (AOA) and angle of departure (AOD) built in, and thus the various example embodiments may use such services directly.

FIG. 12 shows an example method 1200 for using a received signal strength indication (RSSI) to improve direction information in accordance with at least some embodiments. Method 1200 includes operations performed by one or more processing devices of one or more devices (e.g., first computing device 102, second computing device 104, servers 118 of ride hailing service 116) of FIG. 1. The method 1200 may be performed in the same or a similar manner as described above in regards to method 500.

At block 1202, an RSSI may be received at the first computing device 102 from the second computing device 104. The first and second computing device 102 and 104 may be communicating using point-to-point communication (e.g., BLE, UWB) in Zone B. A wide area may be scanned around the first computing device 102 to detect the direction at which the signal is the maximum. At decision block 1204, a determination may be made based on the RSSI whether a strength of the signal is at a maximum. If so, at block 1206, the first computing device 102 may provide an instruction to turn the first computing device 102 to a determined position in a direction of the maximum signal. If the signal is not at the maximum, then at block 2108 a determination may be made based on the RSSI whether the strength of the signal is at a minimum. If so, at block 1210, the first computing device 102 may provide an instruction to turn a body of the passenger 103 a certain number of degrees to remove the body (e.g., liquid) from interfering with the signal.

FIG. 13 shows an example method 1300 for a system of a passenger 103 in a ride hailing situation in accordance with at least some embodiments. The system may correspond to the first computing device 102 of the passenger 103 in FIG. 1, and may include a memory storing instructions, a cellular network interface, a first point-to-point communication interface for medium range communication, a second point-to-point communication interface for close-range communication, a display screen, and/or a processor communicatively coupled to the memory, the cellular network interface, the first point-to-point communication interface, the second point-to-point communication interface, and the display screen. The method 1200 includes operations implemented in the instructions stored on the memory that, when executed, cause the processor to perform the operations. The method 1300 may be performed in the same or a similar manner as described above in regards to method 500.

At block 1302, a request may be transmitted by a passenger 103 for a ride to a destination, the transmitting by the cellular network interface. The request may be submitted using a user interface of a first client application 106 provided to the system by the ride hailing service 116. In some embodiments, the request may be transmitted to the server 118 of the ride hailing service 116.

At block 1304, an indication may be received that a computing device (corresponds to the second computing device 104 in FIG. 1) of the driver 105 accepted the ride to the destination. The indication may include a first unique information of the driver 105 and a token (Token-D 300) of the driver. The indication may be received from the server 118 of the ride hailing service 116. The first unique information of the driver 105 and the first token of the driver 105 may be encrypted when received and the system may use a private key to decrypt the first unique information and the first token of the driver 105.

In some embodiments, the computing device of the driver 105 may have generated the first unique identifier by converting License Plate information 306 to a number-based license plate information; and providing one or more of the number-based license plate information or a Driver ID 302 as seeds to a hash function to generate the first unique information of the driver. In some embodiments, the computing device of the driver 105 may have generated the first token using at least one of a Driver ID 302, Location 304 of the computing device of the driver 105, License Plate information 306, or a Timestamp 308.

At block 1306, first location data of the computing device of the driver 105 may be received by way of the cellular network interface. In some embodiments, the system may use a GPS to determine a first location data of the system.

At block 1308, directions for the system to reach the computing device of the driver 105 may be presented on the display screen, where the directions are based on the first location data of the system and the first location data of the computing device of the driver 105. The directions may guide the system toward the computing device of the driver 105.

At block 1310, a determination may be made, based on the first location of the system and the computing device of the driver 105, that a distance between the system and the computing device of the driver 105 satisfies a first threshold distance condition, and responsive to the determination, a first point-to-point communication session may be established with the computing device of the driver 105, the establishing by way of the first point-to-point communication interface. Establishing the first point-to-point communication session with the computing device of the driver 105 may include receiving a second unique information of the driver 105, and establishing, using the first and second unique information of the driver 105, the first point-to-point communication session between the system and the computing device of the driver 105.

At block 1312, second location data of the computing device of the driver 105 may be received, at the first point-to-point communication interface, from the computing device of the driver 105. In some embodiments, the system may use a GPS to determine a second location data of the system.

At block 1314, directions for the system to reach the computing device of the driver 105 may be presented on the display screen, where the directions are based on the second location data of the system and the second location data of the computing device of the driver 105. The directions may be enhanced using the angle detection systems described in FIGS. 11 and 12.

In some embodiments, a determination may be made based on the second location data of the system and the computing device of the driver 105 that a second distance between the system and the computing device of the driver 105 satisfies a second threshold distance condition, and responsive to thereto establish a second point-to-point communication session (e.g., NFC or UWB) with the computing device of the driver 105, the establishing by way of the second point-to-point communication interface. Further, a second token of the driver 105 may be received, by the second point-to-point communication component, from the computing device of the driver 105, and the processor of the system may authenticate the computing device using the first and second token of the driver. Authenticating the computing device using the first and second token of the driver 105 may include determining that the first and second token of the driver match.

Figure 14:
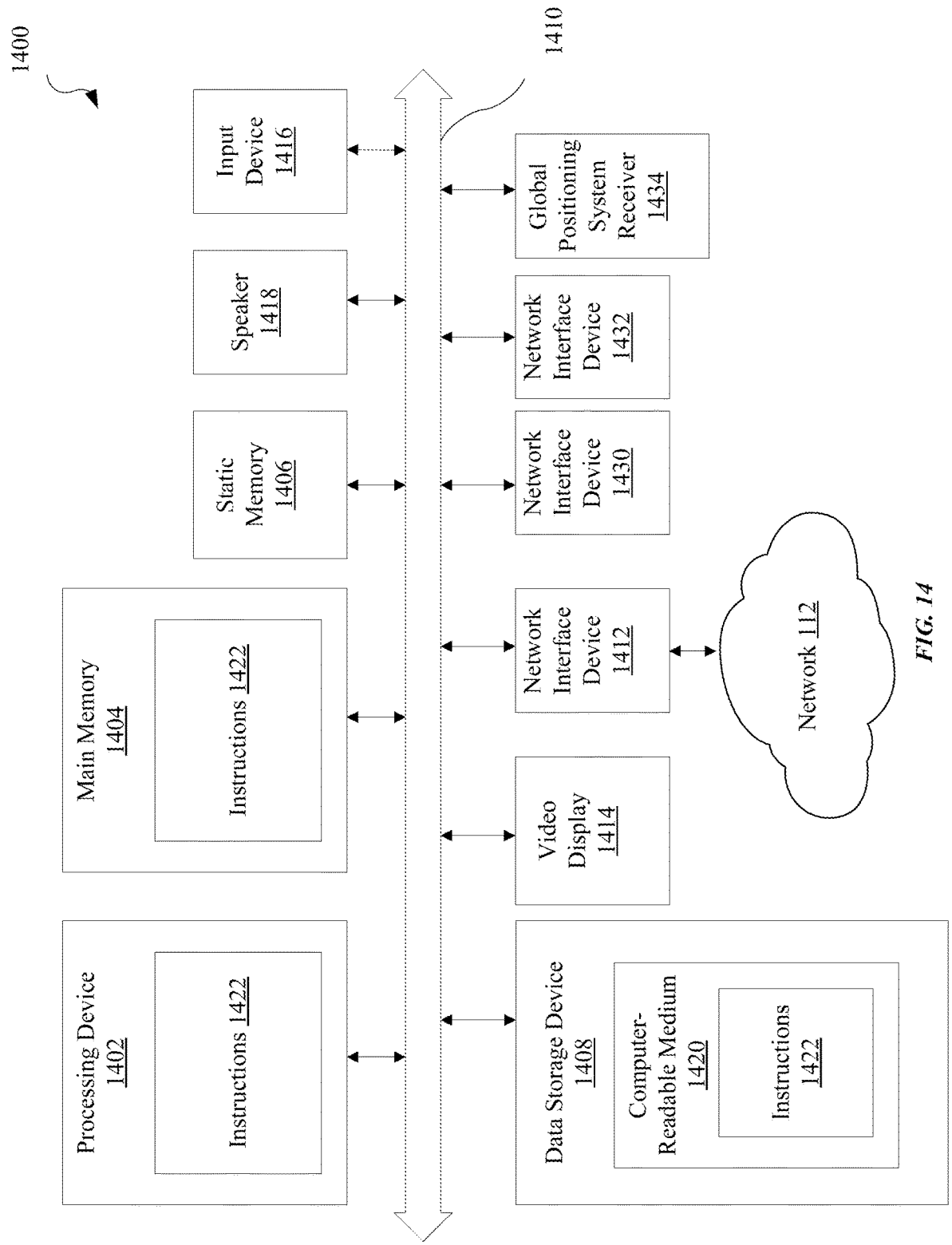
FIG. 14 shows an example computer system in accordance with at least some embodiments.

FIG. 14 illustrates example computer system 1400 which can perform any one or more of the methods described herein, in accordance with one or more aspects of the present disclosure. In one example, computer system 1400 may correspond to the computing device 102 of the passenger 103, the one or more servers 118 of the ride hailing service 116, and/or the computing device 104 of the driver 105 of FIG. 1. The computer system 1400 may be capable of executing the first client application 106 and/or the second client application 108 of FIG. 1. The computer system may be connected (e.g., networked) to other computer systems in a LAN, an intranet, an extranet, or the Internet. The computer system may operate in the capacity of a server in a client-server network environment. The computer system may be a smart phone, personal computer (PC), a tablet computer, a wearable (e.g., wristband), a set-top box (STB), a personal Digital Assistant (PDA), a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 1400 includes a processing device 1402, a main memory 1404 (e.g., read-only memory (ROM), flash memory, dynamic random access memory (DRAM) such as synchronous DRAM (SDRAM)), a static memory 1406 (e.g., solid state drive (SSD), flash memory, static random access memory (SRAM)), and a data storage device 1408, which communicate with each other via a bus 1410.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute instructions for performing any of the operations and steps discussed herein.

The computer system 1400 may further include a network interface device 1412, 1430, and 1432. The network interface device 1412 may be configured to communicate over long ranges via a wireless protocol (e.g., cellular, WiFi). The network interface device 1430 may be configured to communicate over medium ranges using point-to-point communication via a wireless protocol (e.g., BLE, UWB). The network interface device 1432 may be configured to communicate over short ranges using point-to-point communication via a wireless protocol (e.g., NFC, UWB). The computer system 1400 also may include a video display 1414 (e.g., a liquid crystal display (LCD) or a cathode ray tube (CRT)), one or more input devices 1416 (e.g., a keyboard and/or a mouse), and one or more speakers 1418 (e.g., a speaker). In one illustrative example, the video display 1414 and the input device(s) 1416 may be combined into a single component or device (e.g., an LCD touch screen).

The computer system 1400 may further include a global positioning system (GPS) receiver 1434. The GPS receiver 1434 may be configured to receive signals from one or more GPS satellite and determines a distance from the satellites to obtain a latitude and longitude as location data. The GPS receiver 1434 may provide continuous real-time location data of the computer system 1400 to the processing device 1402.

The data storage device 1408 may include a computer-readable medium 1420 on which the instructions 1422 (e.g., implementing the first and second client applications, and/or any functions performed by any device and/or component depicted in the Figures and described herein) embodying any one or more of the methodologies or functions described herein is stored. The instructions 1422 may also reside, completely or at least partially, within the main memory 1404 and/or within the processing device 1402 during execution thereof by the computer system 1400. As such, the main memory 1404 and the processing device 402 also constitute computer-readable media. The instructions 1422 may further be transmitted or received over a network via the network interface device 1412.

While the computer-readable storage medium 1420 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method of authentication in ride hailing situations, the method comprising:
    transmitting, to a server, a request for a ride to a destination, the transmitting by a first computing device of a passenger;
    receiving an indication that a second computing device of a driver accepted the ride to the destination;
    communicating, via the server, first location data of the first computing device to the second computing device and first location data of the second computing device to the first computing device;
    determining a first distance between the first and second computing device based on the first location data of the first and second computing device;
    responsive to determining that the first distance between the first and second computing device satisfies a first threshold distance condition, communicating, via a first point-to-point communication between the first computing device and the second computing device, second location data of the first computing device to the second computing device and second location data of the second computing device to the first computing device; and
    presenting, based on the second location data of the first and second computing device, directions for the first computing device to reach the second computing device and directions for the second computing device to reach the first computing device.

2. The method of claim 1, further comprising:
    communicating, via the server, a first unique information of the passenger to the second computing device and a first unique information of the driver to the first computing device; and
    responsive to determining that the first distance between the first and second computing device satisfies the first threshold distance condition, broadcasting, by the first and second computing device, a second unique information of the passenger and the driver, respectively, that causes the point-to-point communication to be established between the first and second computing device when at least the first and second unique information of the passenger match at the second computing device and the first and second unique information of the driver match at the first computing device.

3. The method of claim 2, wherein the first and second unique information of the passenger are the same, and the first and second unique information of the passenger are generated by:
converting the destination to a number-based destination; and
providing one or more of the number-based destination or a passenger identification as seeds to a hash function to generate the first and second unique information of the passenger.

4. The method of claim 2, wherein the first and second unique information of the driver are the same, and the first and second unique information of the driver are generated by:
converting license plate information to a number-based license plate information; and
providing one or more of the number-based license plate information or a driver identification as seeds to a hash function to generate the first and second unique information of the driver.

5. The method of claim 1, further comprising:
communicating, via the server, a first token of the passenger to the second computing device and a first token of the driver to the first computing device;
communicating, via the first point-to-point communication, third location data of the first computing device to the second computing device and third location data of the second computing device to the first computing device;
determining a second distance between the first and second computing device based on the third location data of the first and second computing device; and
responsive to determining that the second distance between the first and second computing device satisfies a second threshold distance condition, performing authentication between the first and second computing device by:
communicating, via a second point-to-point communication, a second token of the passenger to the second computing device and a second token of the driver to the first computing device.

6. The method of claim 5, wherein the second threshold distance condition is satisfied when the first and second computing device are a shorter distance apart as compared to when the first threshold distance condition is satisfied.

7. The method of claim 5, wherein performing authentication between the first and second computing device further comprises:
determining, at the first computing device, whether the second token of the driver matches the first token of the driver; and
determining, at the second computing device, whether the second token of the passenger matches the first token of the passenger.

8. The method of claim 1, further comprising causing one or more of the following actions to be performed by a vehicle being driven by the driver:
(i) turn on vehicle hazard lights,
(ii) flash head lights of the vehicle,
(iii) implement a pattern of flashing of some or all head lights, or
(iv) honk a horn of the vehicle.

9. The method of claim 5, wherein the first and second token of the passenger are the same, and the method further comprises:
generating the first and second token of the passenger using at least one of a passenger identification provided by the server, a location of the first computing device, the destination, or a timestamp.

10. The method of claim 5, wherein the first and second token of the driver are the same, and the method further comprises:
generating the first and second token of the driver using at least one of a driver identification provided by the server, a location of the second computing device of the driver, a license plate information, or a timestamp.

11. The method of claim 1, further comprising:
determining, based on a received signal strength indication (RSSI) at the first computing device, when a strength of a signal from the second computing device received via the first point-to-point communication is at a maximum; and
responsive to determining that the strength of the signal is at the maximum, providing an instruction to turn the first computing device to a determined position in a direction of the signal.

12. The method of claim 1, further comprising:
determining, based on a received signal strength indication (RSSI) at the first computing device, when a strength of a signal from the second computing device received via the short-ranged communication channel is at a minimum; and
responsive to determining that the strength of the signal is at the minimum, providing an instruction to turn a body of the user a certain number of degrees.

13. A system for authentication in ride hailing situations, the system comprising:
a memory storing instructions;
a cellular network interface;
a first point-to-point communication interface for medium range communication;
a display screen; and
a processor communicatively coupled to the memory, the cellular network interface, the first point-to-point communication interface, and the display screen, wherein, when the instructions are executed by the processor, the instructions cause the processor to:
transmit a request by a passenger for a ride to a destination, the transmitting by the cellular network interface;
receive an indication that a computing device of a driver accepted the ride to the destination, wherein the indication comprises a first unique information of the driver and a first token of the driver;
receive, by way of the cellular network interface, first location data of the computing device;
present, on the display screen, directions for the system to reach the computing device based on a first location data of the system and the first location data of the computing device;
determine, based on the first location data of the system and the computing device, that a first distance between the system and the computing device satisfies a first threshold distance condition, and responsive to the determination, establish a first point-to-point communication session with the computing device of the driver, the establishing by way of the first point-to-point communication interface;

receive, at the first point-to-point communication interface, second location data of the computing device from the computing device;

present, on the display screen, directions for the system to reach the computing device based on a second location data of the system and the second location data of the computing device.

14. The system of claim 13, further comprising:

a second point-to-point communication interface for close-range communication, the second point-to-point interface coupled to the processor;

wherein, when the instructions are executed by the processor, the instructions further cause the processor to:

determine, based on the second location data of the system and the computing device, that a second distance between the system and the computing device satisfies a second threshold distance condition, and responsive to thereto establish a second point-to-point communication session with the computing device of the driver, the establishing by way of the second point-to-point communication interface;

receive, by the second point-to-point communication component, a second token of the driver from the computing device, and authenticate the computing device using the first and second token of the driver.

15. The system of claim 14, wherein the second token is received from the computing device when the computing device and the system contact each other, and the second point-to-point communication session is near field communication.

16. The system of claim 13, wherein the first unique identifier of the driver is generated by:

converting license plate information to a number-based license plate information; and providing one or more of the number-based license plate information or a driver identification as seeds to a hash function to generate the first unique information of the driver.

17. The system of claim 13, wherein the first token of the driver is generated using at least one of a driver identification, a location of the computing device of the driver, a license plate information of the driver, or a timestamp.

18. The system of claim 13, wherein establishing the first point-to-point communication session with the computing device of the driver further comprises the processor to execute the instructions to:

receive a second unique information of the driver, and establish, using the first and second unique information of the driver, the first point-to-point communication session between the system and the computing device.

19. The system of claim 13, wherein, when executed by the processor, the instructions cause the processor to:

determine when a battery level of the system is less than a certain level;

transmit a notification to the computing device that the battery level is less than the certain level, wherein the computing device waits a certain amount of time for the system to respond based on the notification.

20. The system of claim 13, wherein the system further comprises sensors, and when executed by the processor, the instructions cause the processor to:

detect, using the sensors, that the system is moving at a certain speed;

responsive to determining that the system is moving at the certain speed, determine whether authentication with the computing device has been successful;

responsive to determining that the system is moving at the certain speed and authentication has not been successful, transmit a message to a law enforcement agency.

* * * * *